(12) United States Patent
Terashima et al.

(10) Patent No.: US 7,933,494 B2
(45) Date of Patent: Apr. 26, 2011

(54) RECORDING APPARATUS AND METHOD, AND PROGRAM

(75) Inventors: Masayuki Terashima, Kanagawa (JP); Junichi Ogikubo, Kanagawa (JP)

(73) Assignee: Sony Corporation, Tokyo (JP)

( * ) Notice: Subject to any disclaimer, the term of this patent is extended or adjusted under 35 U.S.C. 154(b) by 1266 days.

(21) Appl. No.: 11/517,597

(22) Filed: Sep. 7, 2006

(65) Prior Publication Data

US 2007/0058948 A1 Mar. 15, 2007

(30) Foreign Application Priority Data

Sep. 8, 2005 (JP) .................................. 2005-260175

(51) Int. Cl.
*H04N 5/92* (2006.01)
(52) U.S. Cl. ........................................................ 386/326
(58) Field of Classification Search ................ 386/46–4, 386/52, 69, 238, 48, 326; 348/700
See application file for complete search history.

(56) References Cited

U.S. PATENT DOCUMENTS

| 5,473,380 | A | 12/1995 | Tahara |
| 5,774,441 | A * | 6/1998 | Nakagawa .................... 386/119 |
| 6,163,573 | A | 12/2000 | Mihara |
| 6,445,875 | B1 * | 9/2002 | Akagiri et al. .................. 386/52 |
| 6,493,384 | B1 | 12/2002 | Mihara |
| 6,643,327 | B1 * | 11/2003 | Wang ....................... 375/240.12 |

FOREIGN PATENT DOCUMENTS

| JP | 6 284414 | 10/1994 |
| JP | 9 139916 | 5/1997 |
| JP | 10 70729 | 3/1998 |
| JP | 10 174106 | 6/1998 |

* cited by examiner

*Primary Examiner* — Thai Tran
*Assistant Examiner* — Mishawn Dunn
(74) *Attorney, Agent, or Firm* — Frommer Lawrence & Haug LLP; William S. Frommer; Thomas F. Presson

(57) ABSTRACT

A recording apparatus for recording, when an encoded stream is provided, the encoded stream on a predetermined recording medium, the encoding stream including a plurality of groups each including a plurality of encoded unit data obtained by an encoding process performed for a plurality of unit data which form a stream, the recording apparatus including: a detection section configured to detect the structure of each of the groups which form the encoded stream; and a recording control section configured to produce, when a different group having a structure different from a prescribed structure is detected by the detection section, specification information with which the position of the different group in the encoded stream can be specified and record the specification information as metadata of the encoded stream on the predetermined recording medium.

7 Claims, 17 Drawing Sheets

FIG. 14

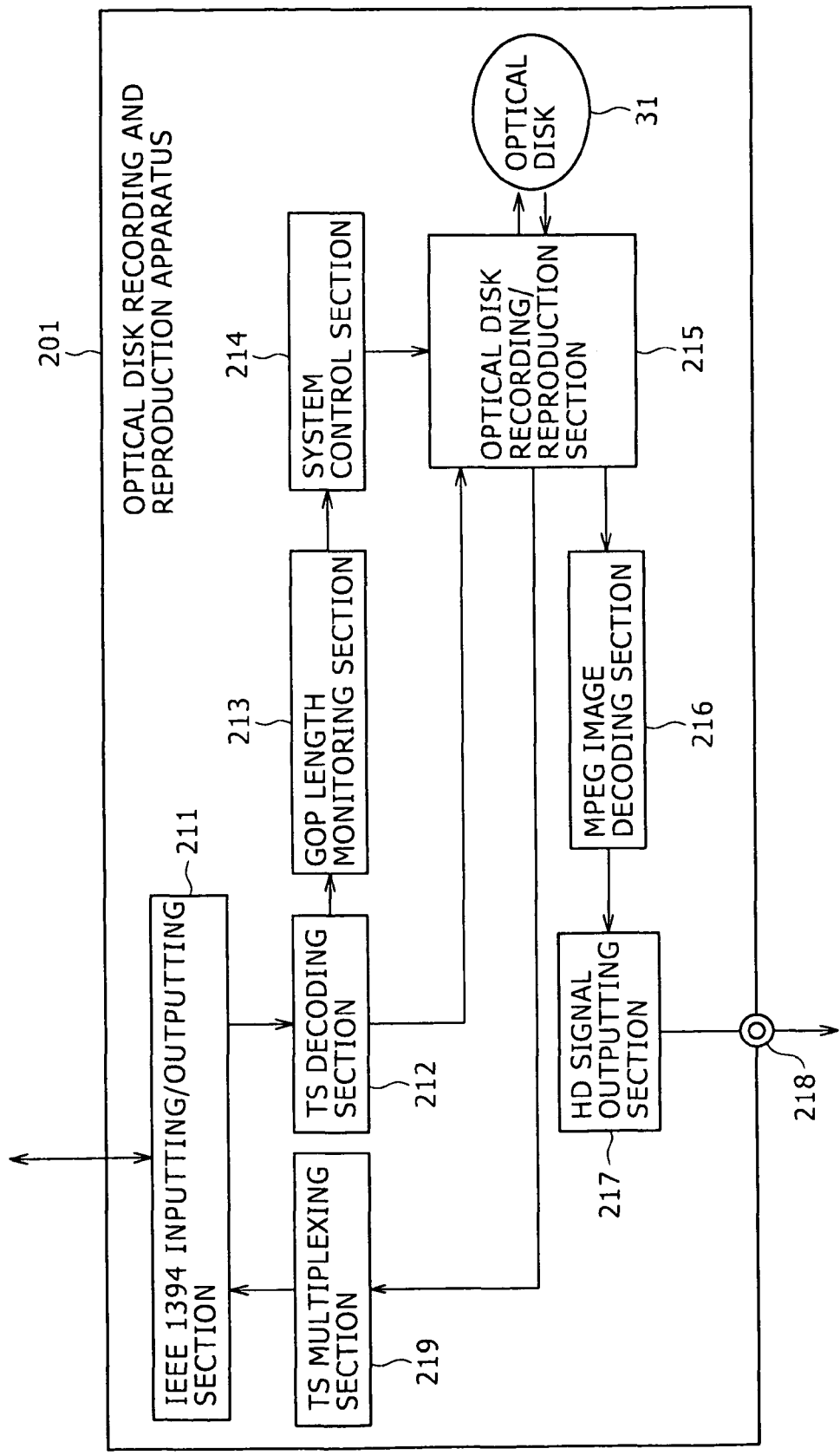

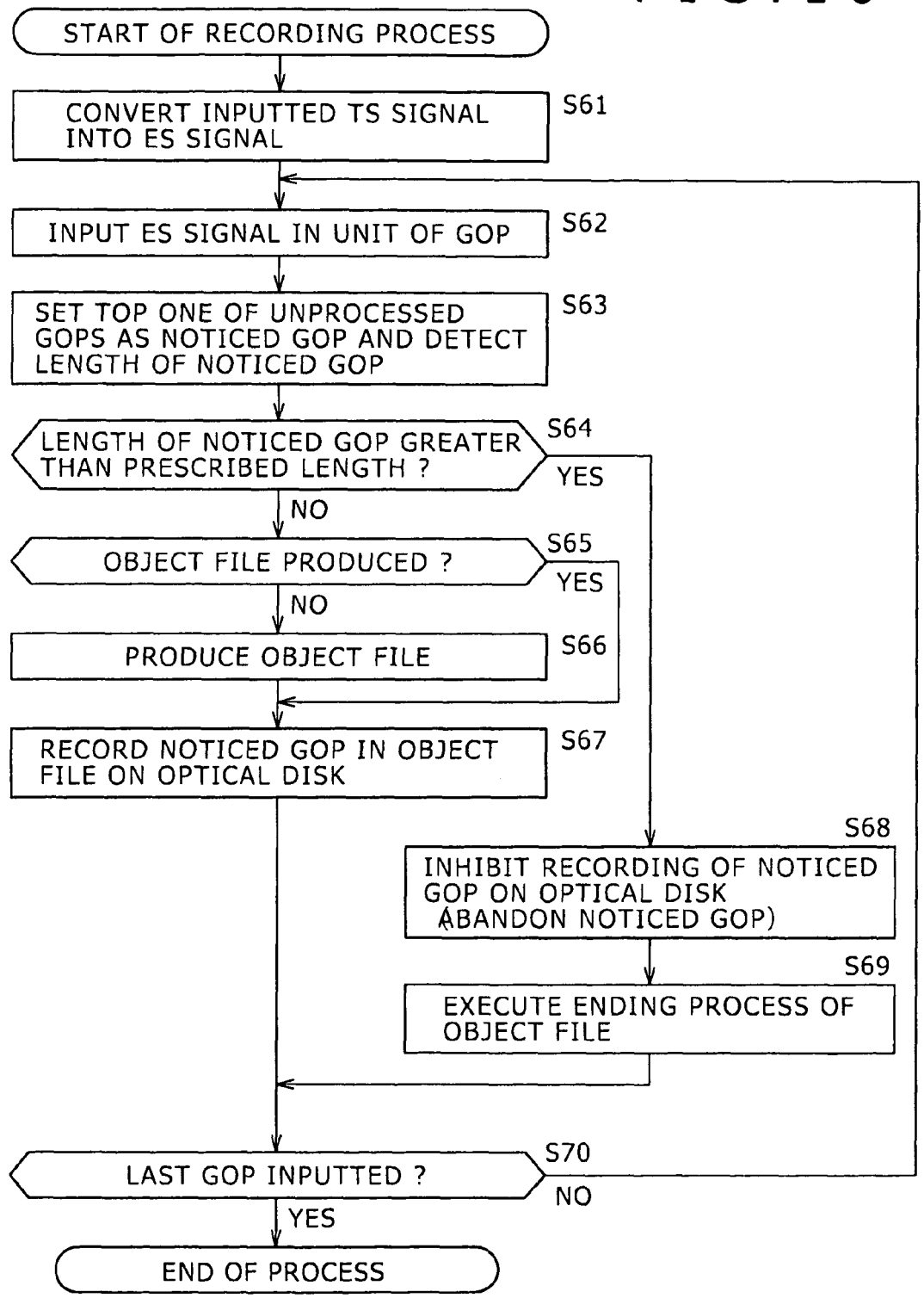

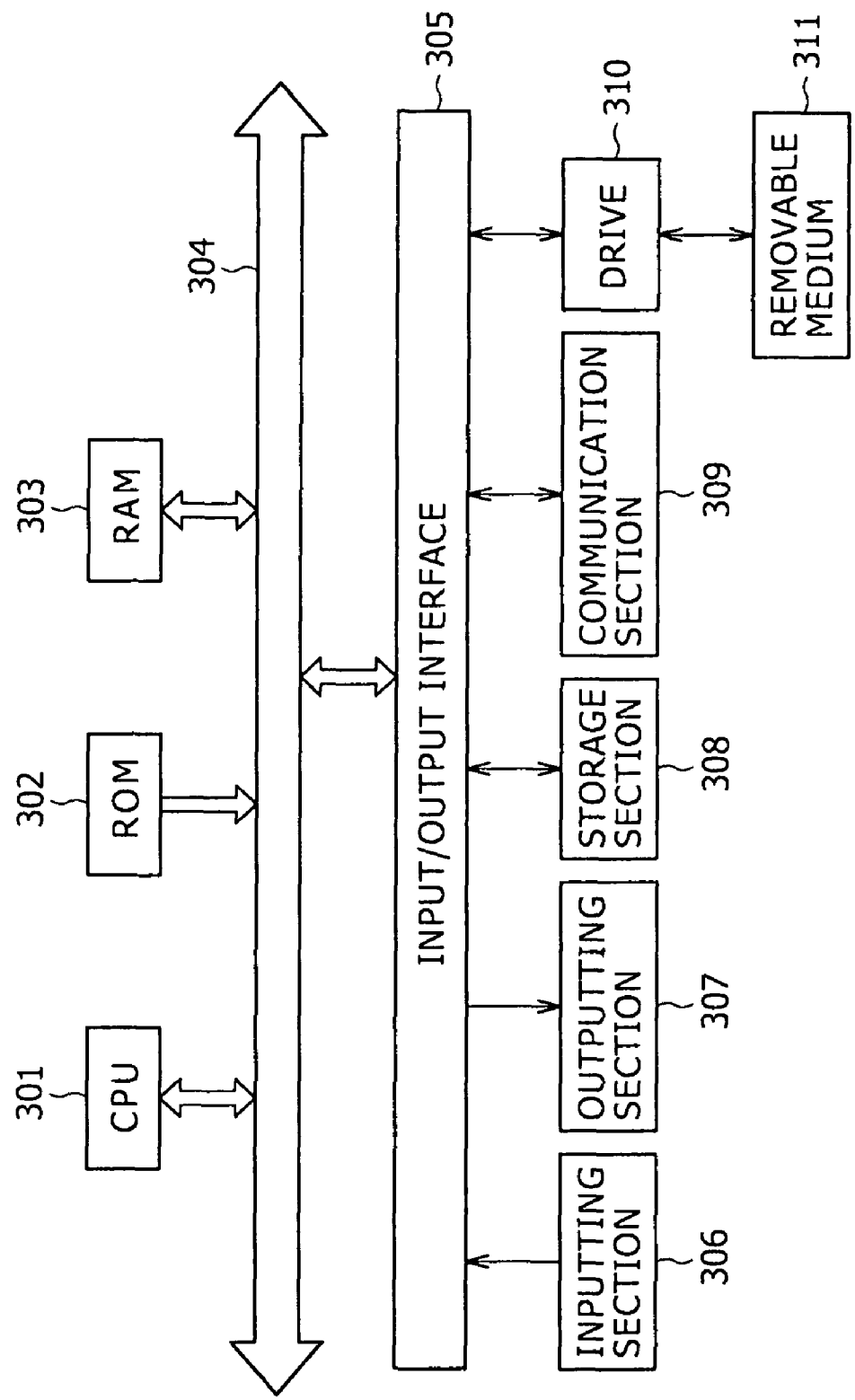

US 7,933,494 B2

RECORDING APPARATUS AND METHOD, AND PROGRAM

CROSS REFERENCES TO RELATED APPLICATIONS

The present invention contains subject matter related to Japanese Patent Application JP 2005-260175 filed with the Japanese Patent Office on Sep. 8, 2005, the entire contents of which being incorporated herein by reference.

BACKGROUND OF THE INVENTION

1. Field of the Invention

This invention relates to a recording apparatus and method and a program, and more particularly to a recording apparatus and method and a program by which a stream can be recorded such that an editing place in the stream can be detected efficiently.

2. Description of the Related Art

In recent years, an optical disk recording and reproduction apparatus utilized in a broadcasting station or the like can compression encode a baseband signal, which complies with the High-Definition Television standards, typically in accordance with the MPEG (Moving Picture Experts Group) system. Then, the optical disk recording and reproduction apparatus can record an elementary stream signal obtained as a result of the compression encoding on an optical disk. An exemplary one of such optical disk recording and reproduction apparatus as described above is disclosed, for example, U.S. Published Patent No. 2004/0148551. Such an optical disk recording and reproduction apparatus as mentioned above can also reproduce or read out an ES signal recorded on an optical disk and transmit the ES signal to some other apparatus of a broadcasting station or the like. It is to be noted that such a baseband signal which complies with the High-Definition Television standards as described above is hereinafter referred to simply as HD signal. Also such an elementary stream signal as mentioned above is hereinafter referred to as ES signal.

The ES signal which is an object of such recording or transmission is sometimes in such an edited form that, for example, a first content and a second content are joined together. Where an ES signal includes an editing place which is a joining point between the first and second contents in this manner, it is necessary to detect the editing point. To this end, a technique is often used wherein the ES signal is actually reproduced to detect a point between two frames between which a change in picture pattern is found as a scene change point.

Thus, it is demanded to utilize a technique which can detect an editing point more efficiently than such a common detection method as described above.

SUMMARY OF THE INVENTION

However, it is current circumstances that an effective technique which can sufficiently satisfy the demand described above is not available.

Therefore, there is a need for a recording apparatus and method and a program by which a stream can be recorded such that an editing place or the like in the stream can be detected efficiently.

According to an embodiment of the present invention, there is provided a recording apparatus for recording, when an encoded stream is provided, the encoded stream on a predetermined recording medium, the encoding stream including a plurality of groups each including a plurality of encoded unit data obtained by an encoding process performed for a plurality of unit data which form a stream, the recording apparatus including a detection section and a recording control section. The detection section configured to detect the structure of each of the groups which form the encoded stream. The recording control section configured to produce, when a different group having a structure different from a prescribed structure is detected by the detection section, specification information with which the position of the different group in the encoded stream can be specified and record the specification information as metadata of the encoded stream on the predetermined recording medium.

The recording apparatus may be configured such that the detection section detects, as the prescribed structure of each of the groups, the number of the encoded unit data included in the group, and the recording control section decides, if a group which includes a number of encoded unit data different from the prescribed number is detected by the detection section, the group as the different group and produces the specification information regarding the different group.

In this instance, the recording apparatus may be configured such that the stream includes a plurality of frames as the unit data; the encoded stream is a stream of GOPs (Groups of Pictures) as the groups obtained by an encoding process performed for the stream in accordance with the MPEG (Moving Picture Experts Group) system. The detection section detects, as the prescribed structure of each of the GOPs, the number of frames as the encoded unit data included in the GOP. The recording control section decides, if a GOP which includes a number of frames other than the prescribed number is detected by the detection section, the GOP as the different group and produces the specification information regarding the different group.

The recording control section may produce, as the specification information, an essence mark to be applied to one or more ones of the frames which form the GOP decided as the different group.

In this instance, the recording control section may produce, as the specification information, the essence mark to be applied to a top one of the frames which form the GOP decided as the different group.

Or, the recording control section may produce, as the specification information, the essence mark to be applied to frames which precede to and succeed a scene change point from among the frames which form the GOP decided as the different group.

Or else, the recording control section may produce, as the specification information, the essence mark to be applied to all of the frames which form the GOP decided as the different group.

The recording apparatus may further include an acquisition section, a decoding section, and an encoding section. The acquisition section configured to acquire, when a first encoded stream obtained by performing an encoding process for a first stream which makes an object of recording on the predetermined recording medium is provided thereto, the first encoded stream. The decoding section configured to perform a decoding process for the first encoded stream acquired by the acquisition section and output a second stream obtained as a result of the decoding process. The encoding section configured to perform an encoding process for the second stream outputted from the decoding section and output a second encoded stream obtained as a result of the encoding process, wherein the detection section detects the structure of each of the groups which form the first encoded stream acquired by the acquisition section, and the recording control section produces the specification information. When the different group is detected from within the first encoded stream by the detection section, the specification information with which the position of that one of the groups in the second encoded stream outputted from the encoding section which corresponds to the different group and record the specification information as metadata of the second encoded stream on the predetermined recording medium.

In this instance, the recording apparatus may be configured such that, when the first encoded stream formed from a plurality of first encoded unit data obtained as a result of the encoding stream successively performed for a plurality of first unit data which form the first stream is provided, the acquisition section acquires the first encoded stream. The decoding section successively performs the decoding process for the first encoded unit data which form the first encoded stream acquired by the acquisition section and output the second stream which is formed from a plurality of second unit data obtained as a result of the decoding process. The encoding section successively performs the encoding process for the second unit data which form the second stream outputted from the decoding section and output the second encoded stream formed from a plurality of second encoded unit data obtained as a result of the encoding process. The recording apparatus further includes a phase information production section and an encoding control section. The phase information production section configured to monitor the decoding process of the decoding section to produce phase information which includes one or more pieces of specification information with which the disposed position of that one of the first encoded unit data which corresponds to a predetermined one of the second unit data in the first encoded stream signal can be specified. The encoding control section configured to control, based on the phase information produced by the phase information production section. The encoding process of the encoding section for noticed data, which is that one of the second unit data which makes an object of the encoding process by the encoding section, so that the disposition position of that one of the first encoded unit data which corresponds to the noticed data in the first encoded stream signal and the disposition position of that one of the second encoded unit data which corresponds to the noticed data in the second encoded stream signal may coincide with each other.

According to another embodiment of the present invention, there is provided a recording method for recording, when an encoded stream is provided, the encoded stream on a predetermined recording medium. Further, according to a further embodiment of the present invention, there is provided a program for causing a computer to execute a process of recording, when an encoded stream is provided, the encoded stream on a predetermined recording medium. In the recording method and the program, the encoding stream includes a plurality of groups each including a plurality of encoded unit data obtained by an encoding process performed for a plurality of unit data which form a stream. Further, the recording method and the program include the steps of detecting the structure of each of the groups which form the encoded stream, and producing, when a different group having a structure different from a prescribed structure is detected, specification information with which the position of the different group in the encoded stream can be specified and recording the specification information as metadata of the encoded stream on the predetermined recording medium.

In the recording method and the program, when an encoded stream including a plurality of groups each including a plurality of encoded unit data obtained by an encoding process performed for a plurality of unit data which form a stream is provided, the encoded stream is recorded on a predetermined recording medium. Thereupon, if a different group having a structure different from a prescribed structure is detected, then specification information with which the position of the different group in the encoded stream can be specified is produced and recorded as metadata of the encoded stream on the predetermined recording medium.

With the recording apparatus and method and the program, a stream can be recorded. Particularly, the stream can be recorded such that an editing place or the like in the stream can be detected efficiently when the recorded stream is reproduced.

BRIEF DESCRIPTION OF THE DRAWINGS

FIG. 14 is a schematic diagrammatic view illustrating a recording method ready for a GOP disorder portion having a length greater than a prescribed length, which is one of techniques to which the present invention is applied;

FIG. 15 is a block diagram showing a further example of the configuration of the optical disk recording and reproduction apparatus to which the present invention is applied;

FIG. 16 is a flow chart illustrating an example of a recording process of the optical disk recording and reproduction apparatus of FIG. 15; and FIG. 17 is a block diagram showing an example of a configuration of a personal computer which executes a program to which the present invention is applied.

DETAILED DESCRIPTION OF THE PREFERRED EMBODIMENTS

One embodiment of the present invention is hereinafter described with reference to FIGS. 1 to 17.

Figure 1:
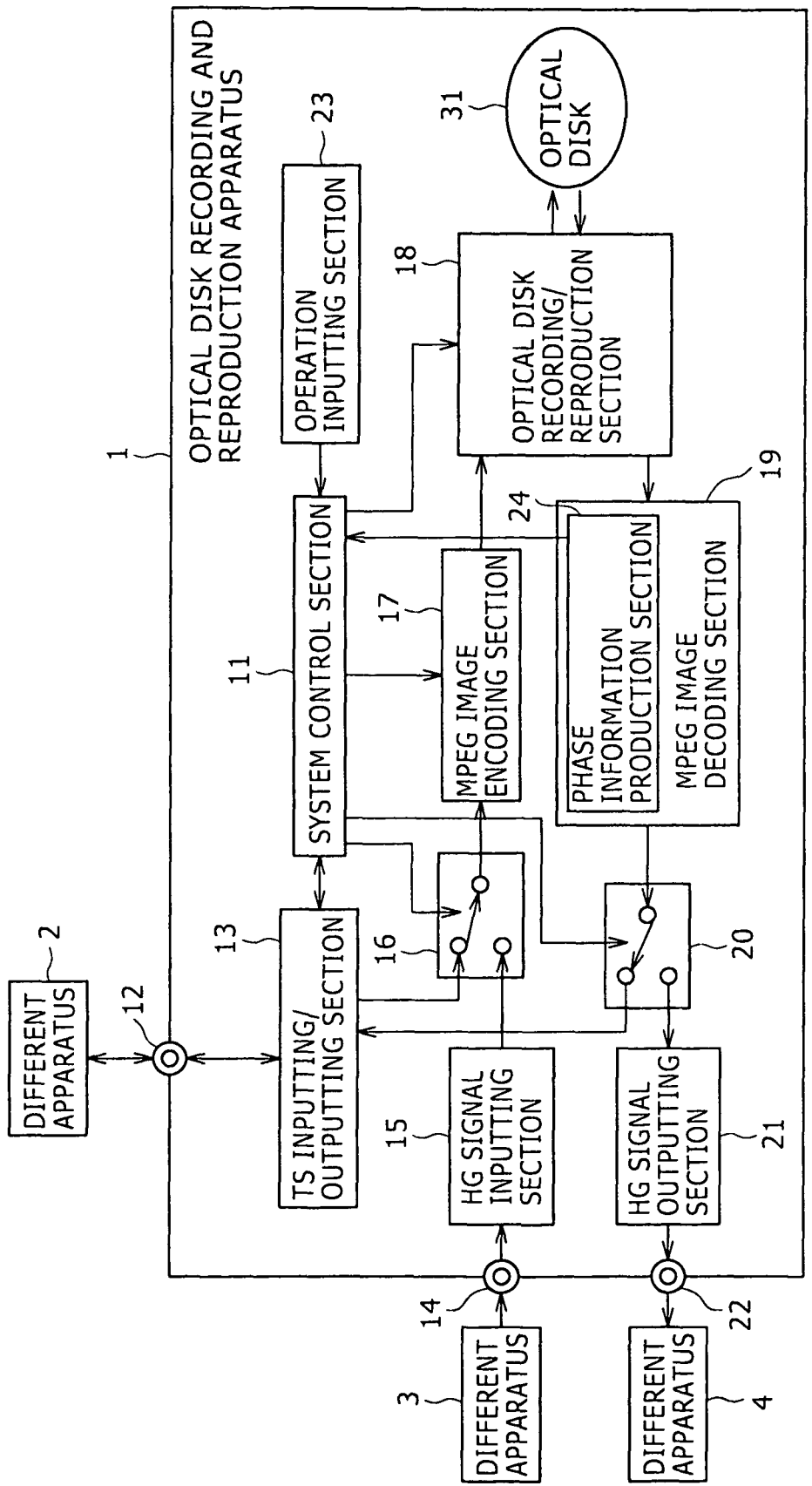
FIG. 1 is a block diagram showing an example of a configuration of an optical disk recording and reproduction apparatus to which the present invention is applied.

FIG. 1 shows an example of a configuration of an optical disk recording and reproduction apparatus as an information processing apparatus to which the present invention is applied.

Referring to FIG. 1, the optical disk recording and reproduction apparatus 1 can compression encode a baseband signal, which complies with the High-Definition Television standards, typically in accordance with the MPEG (Moving Picture Experts Group) system. Further, the optical disk recording and reproduction apparatus 1 can record or write an elementary stream signal obtained as a result of the compression encoding on an optical disk 31. Furthermore, the optical disk recording and reproduction apparatus 1 can decompression decode an ES signal recorded on the optical disk 31 in accordance with the MPEG system and output an HD signal obtained as a result of the decompression decoding. It is to be noted that such a baseband signal which complies with the High-Definition Television standards as described above is hereinafter referred to simply as HD signal. Also such an elementary stream signal as mentioned above is hereinafter referred to as ES signal.

When the optical disk recording and reproduction apparatus 1 transmits or receives an HD signal to or from a different apparatus, it may transmit or receive the HD signal in the form of the HD signal as it is or in another form of a transport stream signal (hereinafter referred to simply as TS signal) prescribed by the IEEE (The Institute of Electrical and Electronics Engineers, Inc.) 1394. It is to be noted that such a transport stream signal as mentioned above is hereinafter referred to simply as TS signal. However, where the HD signal is to be transmitted in the latter form, that is, when a TS signal is to be transmitted, the optical disk recording and reproduction apparatus 1 executes a series of processes after it compression encodes the HD signal typically in accordance with the MPEG system until it converts an ES signal obtained by the compression encoding into a TS signal. It is to be noted that such a series of processes as just mentioned is hereinafter referred to as HD/TS conversion process. On the other hand, where an HD signal is received in the latter form, that is, where a TS signal is received, the optical disk recording and reproduction apparatus 1 executes a series of processes after it converts the TS signal into an ES signal until it decompression decodes the ES signal typically in accordance with the MPEG system. It is to be noted that such a series of processes as just mentioned is hereinafter referred to as TS/HD conversion process.

In the example shown in FIG. 1, the optical disk recording and reproduction apparatus 1 transmits and receives a TS signal to and from a different apparatus 2, receives an HD signal transmitted from another different apparatus 3 and transmits an HD signal to a further different apparatus 4. In order to implement such actions as mentioned above, the optical disk recording and reproduction apparatus 1 in the example of FIG. 1 includes a system control section 11, and a TS inputting/outputting section 13. The optical disk recording and reproduction apparatus 1 further includes an HD signal inputting section 15, a changeover section 16, an MPEG image encoding section 17, and an optical disk recording/reproduction section 18. The optical disk recording and reproduction apparatus 1 further includes an MPEG image decoding section 19, a changeover section 20, an HD signal outputting section 21 and an operation inputting section 23.

The system control section 11 controls entire action of the optical disk recording and reproduction apparatus 1. Upon such control, the system control section 11 executes various processes in accordance with various instructions inputted from the operation inputting section 23 as occasion demands. It is to be noted that particulars of the control processes of the system control section 11 are hereinafter described.

The TS inputting/outputting section 13 receives a TS signal transmitted from the different apparatus 2 through a terminal 12, performs a TS/HD conversion process for the received TS signal and provides an HD signal obtained as a result of the TS/HD conversion process to the changeover section 16. Thereupon, the TS inputting/outputting section 13 produces various kinds of information such as, for example, GOP phase information or GOP disorder information hereinafter described relating to the received TS signal or an ES signal or an HD signal corresponding to the TS signal as occasion demands. The TS inputting/outputting section 13 provides the produced information to the system control section 11.

Further, an HD signal is sometimes provided from the changeover section 20 to the TS inputting/outputting section 13 as hereinafter described. In such an instance, the TS inputting/outputting section 13 performs an HD/TS conversion process for the HD signal and transmits a TS signal obtained as a result of the HD/TS conversion to the different apparatus 2 through the terminal 12. Thereupon, the TS inputting/outputting section 13 acquires and utilizes various kinds of information such as, for example, GOP phase information hereinafter described relating to the HD signal from the system control section 11 as occasion demands.

It is to be noted that a particular example of the TS inputting/outputting section 13 is hereinafter described with reference to FIG. 2.

The HD signal inputting section 15 receives an HD signal transmitted thereto from the different apparatus 3 through a terminal 14 and provides the received HD signal to the changeover section 16.

The changeover section 16 changes over an input thereto between the TS inputting/outputting section 13 side and the HD signal inputting section 15 side under the control of the system control section 11.

In particular, if the input to the changeover section 16 is changed over to the TS inputting/outputting section 13 side, then an HD signal outputted from the TS inputting/outputting section 13, that is, an HD signal transmitted in the form of a TS signal from the different apparatus 2, is inputted to the changeover section 16 and provided to the MPEG image encoding section 17.

On the other hand, if the input to the changeover section 16 is changed over to the HD signal inputting section 15 side, then an HD signal outputted from the HD signal inputting section 15, that is, an HD signal transmitted from the different apparatus 3, is inputted to the changeover section 16 and provided to the MPEG image encoding section 17.

The MPEG image encoding section 17 compression encodes the HD signal from the changeover section 16 in accordance with the MPEG system under the control of the system control section 11 and provides an ES signal obtained as a result of the compression encoding to the optical disk recording/reproduction section 18.

It is to be noted that an HD signal transmitted in the form of a TS signal from the different apparatus 2, that is, an HD signal provided from the TS inputting/outputting section 13 to the MPEG image encoding section 17 through the changeover section 16, is obtained in the following manner. In particular, the HD signal is obtained by converting the TS signal into a first ES signal by a TS/HD conversion process of the TS inputting/outputting section 13 and then decoding the first ES signal in accordance with the MPEG system. More particularly, the HD signal has been subject to a first time encoding process in accordance with the MPEG system by the different apparatus 2 or the like, and a re-encoding process is performed for the HD signal by the MPEG image encoding section 17 to obtain a second ES signal. Then, the second ES signal is provided to the optical disk recording/reproduction section 18. In such an instance, if the re-encoding process is executed without taking the GOP (Group Of Picture) structure into consideration, that is, without taking the GOP structure of the first ES signal into consideration, in the first time encoding process, then this gives rise to the following problem. In particular, this gives rise to a problem that the second ES signal obtained as a result of the re-encoding process exhibits remarkable degradation, that is, degradation of the picture quality upon reproduction of the second ES signal. It is to be noted that the reason why this problem occurs is hereinafter described.

Thus, the MPEG image encoding section 17 in the present embodiment executes a re-encoding process of encoding an HD signal so that the phases of GOPs of the corresponding first ES signal and second ES signal may coincide with each other under the control of the system control section 11. That the phases of GOPs coincide with each other signifies that a frame selected as an I picture from each of frames which form the HD signal coincides between the first ES signal and the second ES signal and besides the structure of the GOP including the I picture coincides between the first ES signal and the second ES signal. It is to be noted that details of the re-encoding process and so forth are hereinafter described with reference to FIGS. 3 and 4.

The optical disk recording/reproduction section 18 records or writes an ES signal provided from the MPEG image encoding section 17 on the optical disk 31 under the control of the system control section 11.

Further, the optical disk recording/reproduction section 18 reproduces or reads out an ES signal stored in the optical disk 31 and provides the ES signal to the MPEG image decoding section 19 under the control of the system control section 11.

It is to be noted that, although details are hereinafter described with reference to FIGS. 8 to 13, each of GOPs which form an ES signal of a recording object on the optical disk 31, that is, an ES signal outputted from the MPEG image encoding section 17, has all of GOP structures generally prescribed in advance. However, the GOPs may possibly include a GOP which has a GOP structure different from that of the other GOPs. In such an instance, the optical disk recording/reproduction section 18 applies an essence mark to the GOP which has the different GOP structure under the control of the system control section 11. More particularly, the optical disk recording/reproduction section 18 applies an essence mark to one or more of frames or fields which form the GOP. Consequently, it is possible to record or write the essence mark as metadata in a coordinated relationship with the ES signal of the recording object on the optical disk 31.

The essence mark is information to be recorded together with an image such as an ES signal in the example of FIG. 1 on a recording medium such as the optical disk 31 in the example of FIG. 1. Further, the essence mark is mark information representative of a recording start point, a scene change point, a goodshot and so forth for enhancing the searchability of recorded contents. However, in the present embodiment, the essence mark is utilized as mark information representative not of a recording start point, a scene change point or a goodshot but of a portion of a GOP having a GOP structure different from that of the other GOPs. Such a portion as just described is hereinafter referred to as GOP disorder portion.

The MPEG image decoding section 19 decompression decodes an ES signal read out in accordance with the MPEG system from the optical disk 31 by the optical disk recording/reproduction section 18. Then, the MPEG image decoding section 19 provides an HD signal obtained as a result of the decompression decoding to the changeover section 20 under the control of the system control section 11.

It is to be noted that the HD signal outputted from the MPEG image decoding section 19 is a signal obtained by decoding a first ES signal obtained by the first time encoding process in accordance with the MPEG system, that is, the first ES signal recorded on the optical disk 31, as described hereinabove by means of the MPEG image decoding section 19. Accordingly, if such an HD signal as just described is provided to the TS inputting/outputting section 13 through the changeover section 20 hereinafter described, then the HD signal is converted into a second ES signal by a re-encoding process according to the HD/TS conversion process of the TS inputting/outputting section 13 and then converted into a TS signal. In particular, if the re-encoding process is executed without taking the GOP structure of the first ES signal into consideration, then this gives rise to the problem described hereinabove that the second ES signal obtained as a result of the re-encoding process exhibits significant degradation, that is, degradation of the picture quality upon reproduction of the second ES signal. It is to be noted that the reason why such problem occurs is hereinafter described.

Therefore, in the present embodiment, the TS inputting/outputting section 13, or more particularly an MPEG image encoding section 44 of FIG. 2 hereinafter described, executes a re-encoding process of encoding an HD signal so that the phases of GOPs of the corresponding first ES signal and second ES signal may coincide with each other as part of the HD/TS conversion process.

Although details of the re-encoding process are hereinafter described with reference to FIGS. 5 and 6, in order for the system control section 11 to control the re-encoding process, information representative of the phase of each GOP of the first ES signal is demanded. In other words, information is demanded with which that one of GOPs of the first ES signal before decoding and that one of pictures (frames) in the GOP which correspond to each of GOPs of each of frames which form the HD signal can be specified. The information described is hereinafter referred to as GOP phase information.

To this end, the MPEG image decoding section 19 includes a phase information production section 24 for producing such GOP phase information as mentioned above. In particular, the phase information production section 24 produces GOP phase information regarding an ES signal of a decoding object of the MPEG image decoding section 19, that is, the first ES signal described hereinabove where it is viewed from the TS inputting/outputting section 13. Then, the phase information production section 24 provides the produced GOP phase information to the system control section 11.

The changeover section 20 changes over the output thereof to one of the TS inputting/outputting section 13 side and the HD signal outputting section 21 side under the control of the system control section 11.

In particular, when the output of the changeover section 20 is changed over to the TS inputting/outputting section 13 side, an HD signal outputted from the MPEG image decoding section 19, that is, an HD signal recorded in the form of an ES signal on the optical disk 31, is inputted to the changeover section 20. The HD signal is provided to the TS inputting/outputting section 13, by which it is converted into a TS signal by the TS inputting/outputting section 13 and provided to the different apparatus 2 through the terminal 12 as described hereinabove.

On the other hand, where the output of the changeover section 20 is changed over to the HD signal outputting section 21 side, an HD signal outputted from the MPEG image decoding section 19 is provided to the HD signal outputting section 21.

The HD signal outputting section 21 provides the HD signal provided from the changeover section 20, that is, an HD signal recorded in the form of an ES signal on the optical disk 31, to the different apparatus 4 through a terminal 22.

The operation inputting section 23 is operated by a user and provides various instructions and so forth from the user to the system control section 11.

Now, an example of a detailed configuration of the TS inputting/outputting section 13 is described with reference to FIG. 2.

Figure 2:
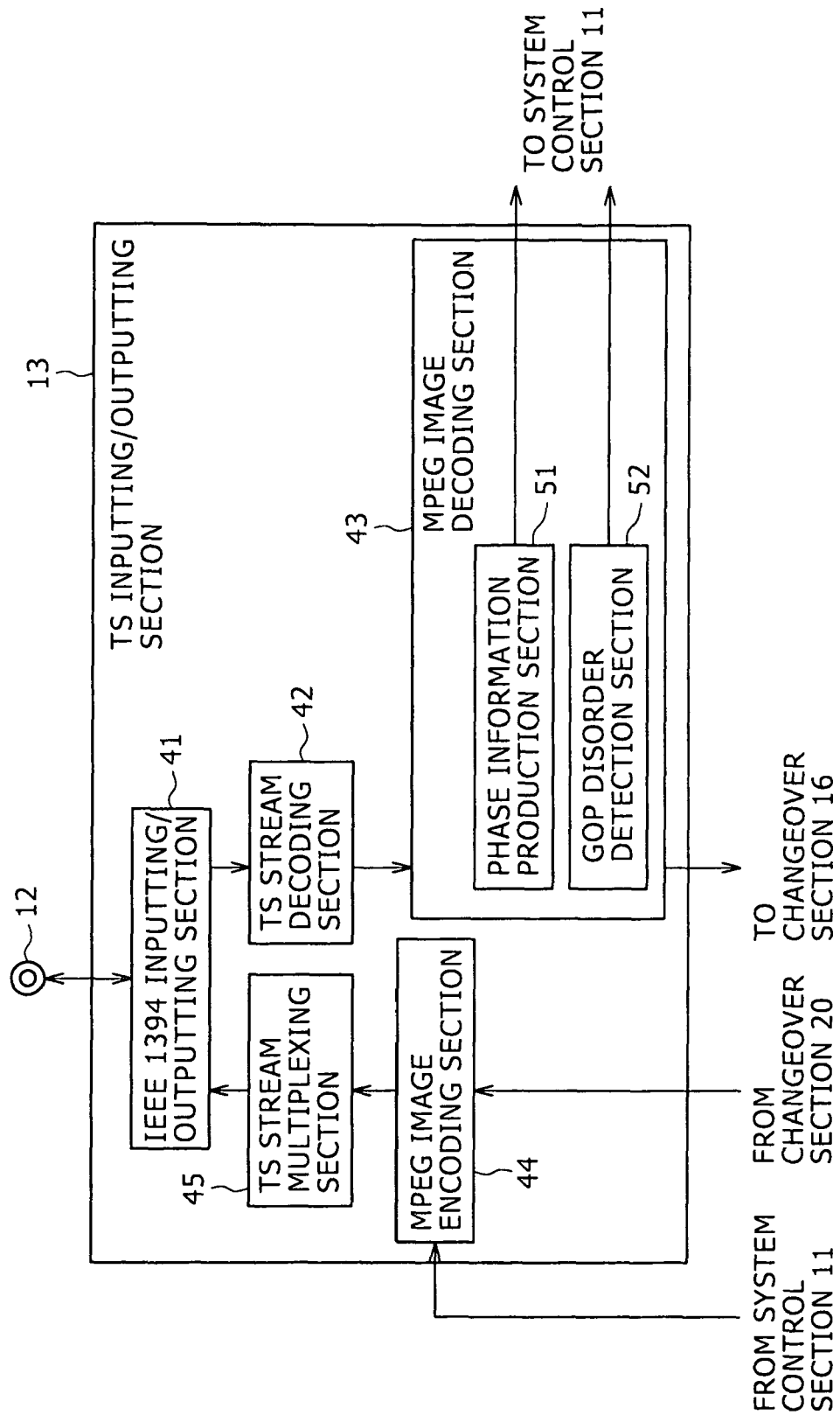
FIG. 2 is a block diagram showing an example of a detailed configuration of a TS inputting and outputting section of the optical disk recording and reproduction apparatus of FIG. 1.

In the example shown in FIG. 2, the TS inputting/outputting section 13 includes an IEEE 1394 inputting/outputting section 41, a TS stream decoding section 42, an MPEG image decoding section 43, an MPEG image encoding section 44 and a TS stream multiplexing section 45.

The IEEE 1394 inputting/outputting section 41 outputs a TS signal provided thereto from the TS stream multiplexing section 45 hereinafter described through the terminal 12. In the example of FIG. 1, the TS signal outputted from the terminal 12 is transmitted to the different apparatus 2.

Further, the IEEE 1394 inputting/outputting section 41 provides a TS signal inputted thereto through the terminal 12 to the TS stream decoding section 42. In the example of FIG. 1, the IEEE 1394 inputting/outputting section 41 provides a TS signal transmitted thereto from the different apparatus 2.

The TS stream decoding section 42 converts the TS signal provided thereto from the IEEE 1394 inputting/outputting section 41 into an ES signal and provides the ES signal to the MPEG image decoding section 43.

The MPEG image decoding section 43 decompression decodes the ES signal provided thereto from the TS stream decoding section 42 in accordance with the MPEG system and provides an HD signal obtained as a result of the decompression decoding to the changeover section 16 shown in FIG. 1.

As described hereinabove, the HD signal outputted from the MPEG image decoding section 43 is subject to a re-encoding process by the MPEG image encoding section 17 shown in FIG. 1 and then is recorded on the optical disk 31. Thereupon, the MPEG image encoding section 17 executes the re-encoding process so that the HD signal has a phase of GOPs which coincides with the phase of GOPs of the first ES signal of a decoding object of the MPEG image decoding section 43. In other words, the MPEG image encoding section 17 is controlled by the system control section 11 so that such a re-encoding process as just described is executed. As a result, a second ES signal of a recording object on the optical disk 31 is obtained. In order to implement such a re-encoding process as just described, that is, in order for the system control section 11 to execute such control, GOP phase information of the first ES signal is demanded.

To this end, the MPEG image decoding section 43 includes a phase information production section 51 for producing such GOP phase information as just mentioned. The phase information production section 51 produces GOP phase information of the first ES signal provided thereto from the TS stream decoding section 42, that is, of the first ES signal of a decoding object of the MPEG image decoding section 43. Then, the phase information production section 51 provides the produced GOP phase information to the system control section 11. It is to be noted that details of a control process and so forth of the system control section 11 which utilizes the GOP phase information are hereinafter described with reference to FIGS. 3 and 4.

Further, the first ES signal provided from the TS stream decoding section 42 sometimes includes a GOP having a GOP structure different from that of the other GOPs, that is, a GOP disorder portion as described hereinabove. In order to detect such a GOP disorder portion, the MPEG image decoding section 43 includes a GOP disorder detection section 52. The GOP disorder detection section 52 monitors the GOP structure of GOPs which form the first ES signal provided from the TS stream decoding section 42, that is, the first ES signal of a decoding object of the MPEG image decoding section 43. Then, if the GOP disorder detection section 52 detects a GOP disorder portion, then it produces information with which the GOP disorder portion can be specified. The last-mentioned information is hereinafter referred to as GOP disorder information. Then, the GOP disorder detection section 52 provides the produced GOP disorder information to the system control section 11. It is to be noted that the system control section 11 refers to the GOP disorder information to execute a control process. As the control process, the system control section 11 determines, from among frames which form the second ES signal of a recording object of the optical disk 31, that frame to which the essence mark is to be applied. Then, the system control section 11 applies the essence mark to the determined frame. Further, the system control section 11 causes the essence mark thus applied to be recorded as metadata of the second ES signal on the optical disk 31. It is to be noted that details of such a control process as just mentioned are hereinafter described with reference to FIGS. 8 to 13.

The MPEG image encoding section 44 compression encodes the HD signal from the changeover section 20 in accordance with the MPEG system under the control of the system control section 11. Then, the MPEG image encoding section 44 provides an ES signal obtained as a result of the compression encoding to the TS stream multiplexing section 45.

It is to be noted that, as described hereinabove, such control of the system control section 11 as mentioned above signifies control which utilizes the GOP phase information from the MPEG image decoding section 19 in FIG. 1. As a result of such control of the system control section 11, the GOP phase of the first ES signal recorded on the optical disk 31 and the GOP phase of the second ES signal provided from the MPEG image encoding section 44 to the TS stream multiplexing section 45 are made coincide with each other. Particulars of this are hereinafter described with reference to FIGS. 5 and 6.

The TS stream multiplexing section 45 converts the ES signal from the MPEG image encoding section 44, that is, the second ES signal whose GOP phase coincides with that of the first ES signal recorded on the optical disk 31, into a TS signal. Then, the TS stream multiplexing section 45 provides the TS signal to the IEEE 1394 inputting/outputting section 41.

The terminal 12 has such a particular configuration example as described above.

Figure 3:
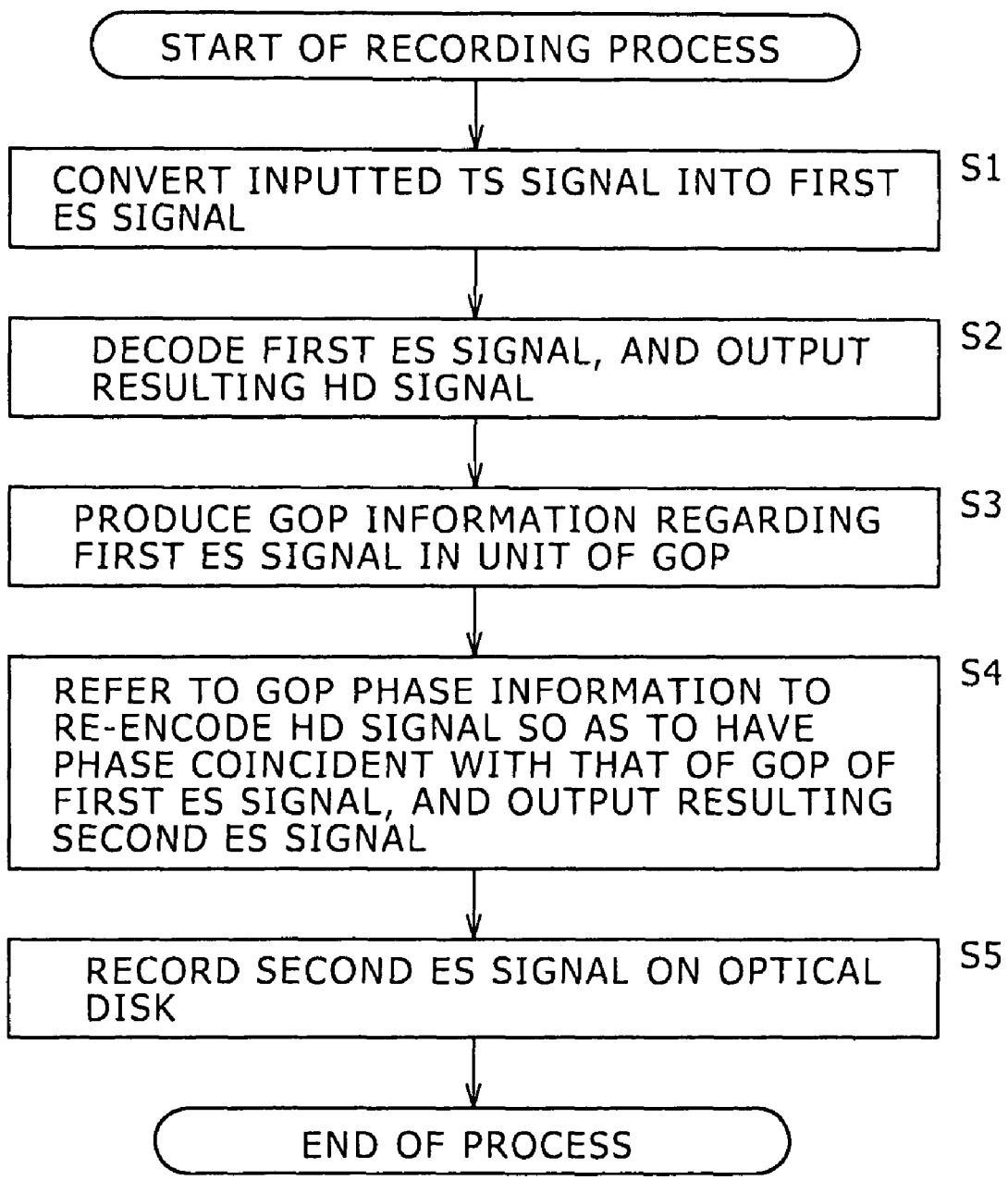
FIG. 3 is a flow chart illustrating an example of a recording process of the optical disk recording and reproduction apparatus of FIG. 1.
Figure 4:
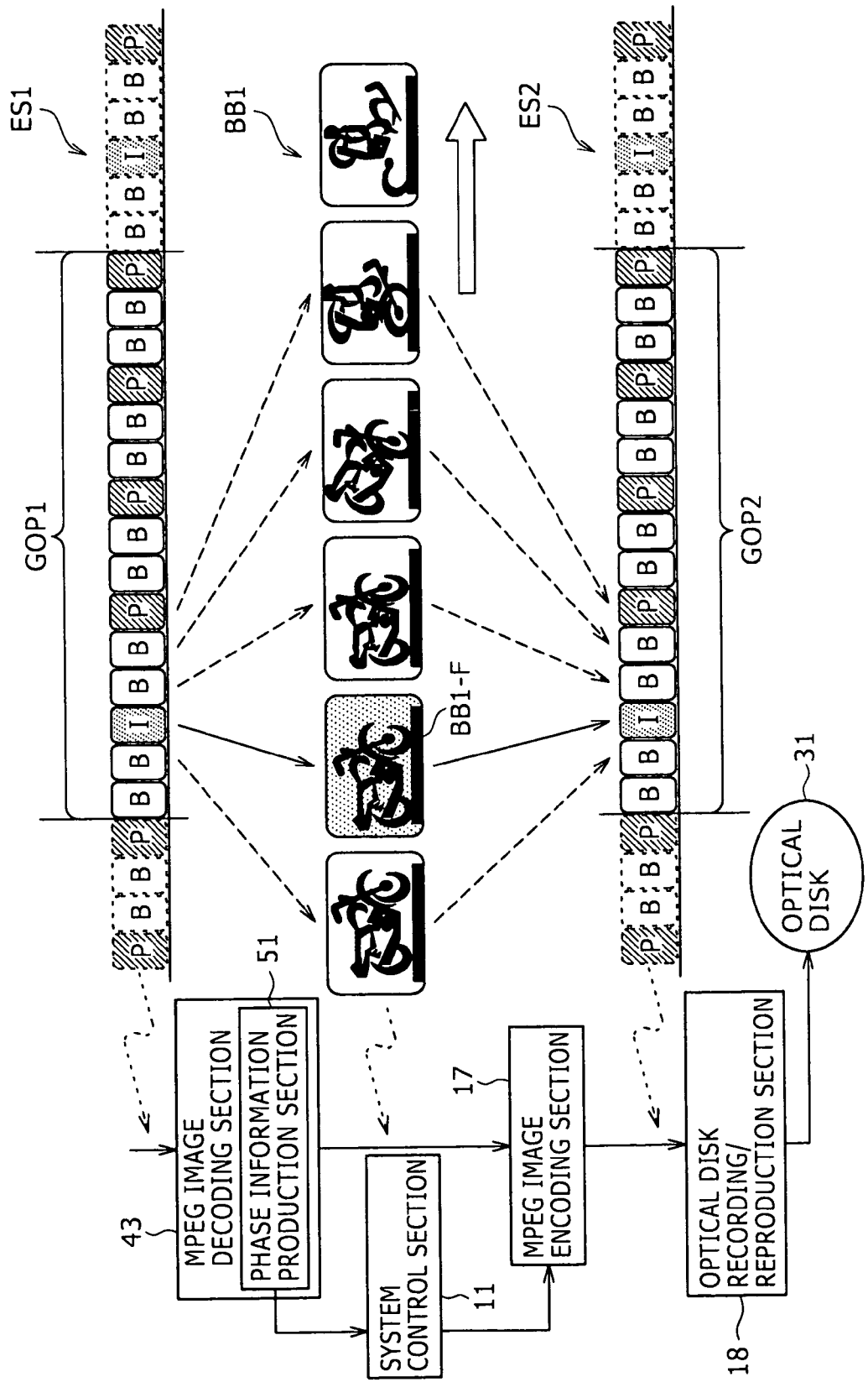
FIG. 4 is a schematic diagrammatic view illustrating an example of the recording process of the optical disk recording and reproduction apparatus.

Now, referring to FIGS. 3 and 4, an example of a series of processes, from within the process or action of the optical disk recording and reproduction apparatus 1 of the example of FIG. 1, until an HD signal transmitted in the form of a TS signal from the different apparatus 2 is recorded in the form of an ES signal on the optical disk 31 is described. The series of processes is hereinafter referred to as recording process.

FIG. 3 is a flow chart illustrating an example of the recording process, and FIG. 4 is a schematic diagrammatic view illustrating the example of the recording process.

If a TS signal transmitted from the different apparatus 2 of FIG. 1 is inputted to the TS inputting/outputting section 13 through the terminal 12 or more particularly inputted to the TS stream decoding section 42 through the IEEE 1394 inputting/outputting section 41 shown in FIG. 2, then the recording process of the example of FIG. 3 is started.

At step S1, the TS stream decoding section 42 converts the TS signal inputted thereto into a first ES signal.

The first ES signal is provided from the TS stream decoding section 42 to the MPEG image decoding section 43, and then the processing advances to step S2. At step S2, the MPEG image decoding section 43 decodes the first ES signal and outputs an HD signal obtained as a result of the decoding to the MPEG image encoding section 17 through the changeover section 16 of FIG. 1.

Further, at step S3, the phase information production section 51 shown in FIG. 2 or 4 of the MPEG image decoding section 43 produces GOP phase information regarding the first ES signal in a unit of a GOP and outputs the produced GOP phase information to the system control section 11.

It is to be noted that, while it is illustrated in the example of FIG. 3 that the process at step S3 is executed after the decoding process at step S2 for the convenience of illustration and description, the process at step S3 may otherwise be executed independently during the decoding process at step S2. In other words, the process of producing GOP phase information regarding a predetermined GOP may be executed during, before or after the decoding process regarding the predetermined GOP.

The processes at steps S1 to S3 are described further with reference to FIG. 4.

In the example of FIG. 4, a signal ES1 is obtained as a result of the process at step S1, that is, as the first ES signal, and the thus obtained signal ES1 is provided to the MPEG image decoding section 43.

Each of GOPs which form the signal ES1 has a GOP structure composed of 15 frames or data. More particularly, the GOP structure includes 15 frames of B, B, I, B, B, P, B, B, P, B, B, P, B, B, P pictures in the order of reproduction. It is to be noted that, in the present embodiment, also the ES signal hereinafter described has a GOP structure same as that of the signal ES1. It is to be noted, however, that a GOP disorder portion signifies that the GOP has a GOP structure different from that of the other GOPs, and therefore, naturally the GOP disorder portion does not have the GOP structure specified as above.

In the GOP structure described above, "I" denotes an I picture; "P" a P picture; and "B" a B picture.

The I picture is an intra picture and is a screen or image data obtained as a result of compression encoding only of information within one frame. Usually, only one I picture is included in each GOP, and the I picture is a frame which makes a basis of compression of the GOP, that is, a basis for an encoding process or a decoding process. Therefore, the I picture includes the greatest data amount per one screen and includes the least amount of block errors.

The P picture is a predictive picture and is a screen or image data obtained by motion predictive encoding from an immediately preceding I or P picture. In the present embodiment, including also FIG. 4, four P pictures are included in each GOP. The P picture includes an amount of data smaller than that of the I picture and usually includes a greater amount of block errors than the I picture.

The B picture is a bidirectional predictive picture and is a screen or image data obtained by motion predictive encoding from I or P pictures which immediately precedes and succeeds the B picture. In the present embodiment, including also FIG. 4, 10 B pictures are included in each GOP, and the B picture includes the smallest amount of data per one screen and an image thereof usually includes the greatest amount of block errors.

If the signal ES1 having such a structure as described above is decoded by the process at step S2 by the MPEG image decoding section 43, then in the example of FIG. 4, a signal BB1 is obtained as an HD signal. It is to be noted that, in order to facilitate understanding, the signal BB1 in FIG. 4 is schematically shown as a set of images of frames including images of a motorcycle.

When the MPEG image encoding section 17 performs a re-encoding process for the signal BB1, if the phase of the GOPs of the signal ES1 is not taken into consideration, then such a situation that, from among the frames which form the signal BB1, a frame which was a B or P picture in the signal ES1 is selected as an I picture may possibly occur frequently. Any frame which was a B or P picture in the signal ES1 usually includes a greater amount of block errors than that of a frame which was an I picture in the signal ES1 as described hereinabove. Accordingly, if the MPEG image encoding section 17 selects such a frame which includes a comparatively great amount of block errors as just described as an I picture and performs a re-encoding process for the signal BB1, then this gives rise to the following problem. In particular, the ES signal obtained as a result of the re-encoding process exhibits increased degradation, that is, increased degradation of the picture quality upon reproduction of the ES signal.

Accordingly, in order to solve this problem, or in other words, in order to optimize the picture quality upon reproduction of the ES signal obtained as a result of the re-encoding process, a frame having the highest picture quality, that is, an original I picture, that is, an I picture upon the first encoding, should be selected as an I picture which makes a basis for the re-encoding process. In particular, the MPEG image encoding section 17 should perform, for the signal BB1, such a re-encoding process that a frame which was an I picture in the signal ES1 is selected as it is as an I picture. Or in other words, the MPEG image encoding section 17 should perform a re-encoding process which makes the phase of the I picture coincide with the phase of the GOPs of the signal ES1. More particularly, for example, in the example of FIG. 4, the MPEG image encoding section 17 should select a frame BB1-F, which was an I picture in the signal ES1, from within the signal BB1 as it is as an I picture and perform a re-encoding process for the 15 frames corresponding to the GOP GOP1 of the signal ES1. As a result of such a re-encoding process as just described, such a signal ES2 as shown in FIG. 4, that is, a signal ES2 including a GOP GOP2 having a phase which coincides with that of the GOP GOP1 of the signal ES1, is obtained as the second ES signal.

In order to implement such a re-encoding process of the MPEG image encoding section 17 as just described, information is demanded with which it can be specified which one of frames or data which form an HD signal, which is, in the example of FIG. 4, the signal BB1, was an I picture in the ES signal before decoding, which is, in the example of FIG. 4, the signal ES1. In the present embodiment, such information is produced as GOP phase information by the phase information production section 51 of the MPEG image decoding section 43 and provided to the system control section 11.

Then, in the example of FIG. 4, the system control section 11 decides based on the GOP phase information whether or not each of the frames which form the signal BB1, that is, each of the frames including the images of the motorcycle in FIG. 4, was an I picture in the signal ES1. If it is decided that any of the frames was an I picture, then the system control section 11 notifies the MPEG image encoding section 17 of this fact. In particular, in FIG. 4, the system control section 11 notifies the MPEG image encoding section 17 that the frame BB1-F was an I picture in the signal ES1. Thus, the MPEG image encoding section 17 performs, for the signal BB1, a re-encoding process of selecting, from among the frames or data which form the signal BB1, the frame, which is, in FIG. 4, the frame BB1-F and is designated as an I picture in the notification received from the system control section 11 as an I picture. Then, the MPEG image encoding section 17 provides a signal ES2 obtained as a result of the re-encoding process to the optical disk recording/reproduction section 18.

Such a re-encoding process of the MPEG image encoding section 17 performed under the control of the system control section 11 as described above is executed as a process at step S4 of FIG. 3. In other words, at step S4, the MPEG image encoding section 17 refers to the GOP phase information to re-encode the HD signal so that the phase of the HD signal may coincide with that of the first ES signal. More accurately, the system control section 11 actually refers to the GOP phase information, and the MPEG image encoding section 17 performs such re-encoding of the HD signal under the control of the system control section 11. Then, the MPEG image encoding section 17 outputs a second ES signal obtained as a result of the re-encoding to the optical disk recording/reproduction section 18.

Consequently, at step S5, the optical disk recording/reproduction section 18 records the second ES signal, in FIG. 4 the signal ES2, on the optical disk 31.

The recording process of the optical disk recording and reproduction apparatus 1 of the example of FIG. 1 is completed therewith.

Now, an example of a series of processes, from within processing or action of the optical disk recording and reproduction apparatus 1 of the example of FIG. 1, until an HD signal recorded in the form of an ES signal on the optical disk 31 is reproduced or read out and transmitted in the form of a TS signal to the different apparatus 2 is described. The series of processes is hereinafter referred to as reproduction process.

Figure 5:
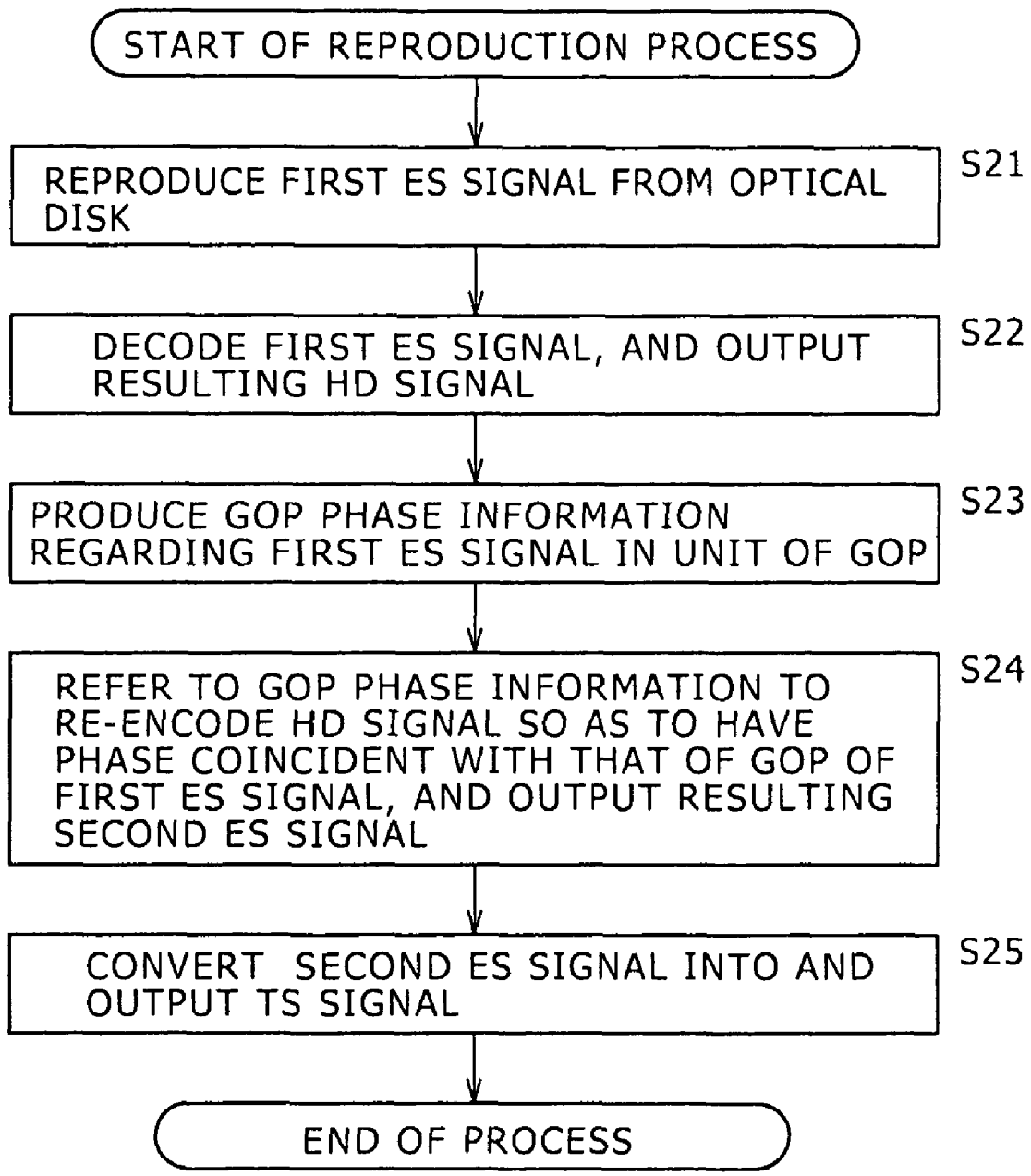
FIG. 5 is a flow chart illustrating an example of a reproduction process of the optical disk recording and reproduction apparatus of FIG. 1.
Figure 6:
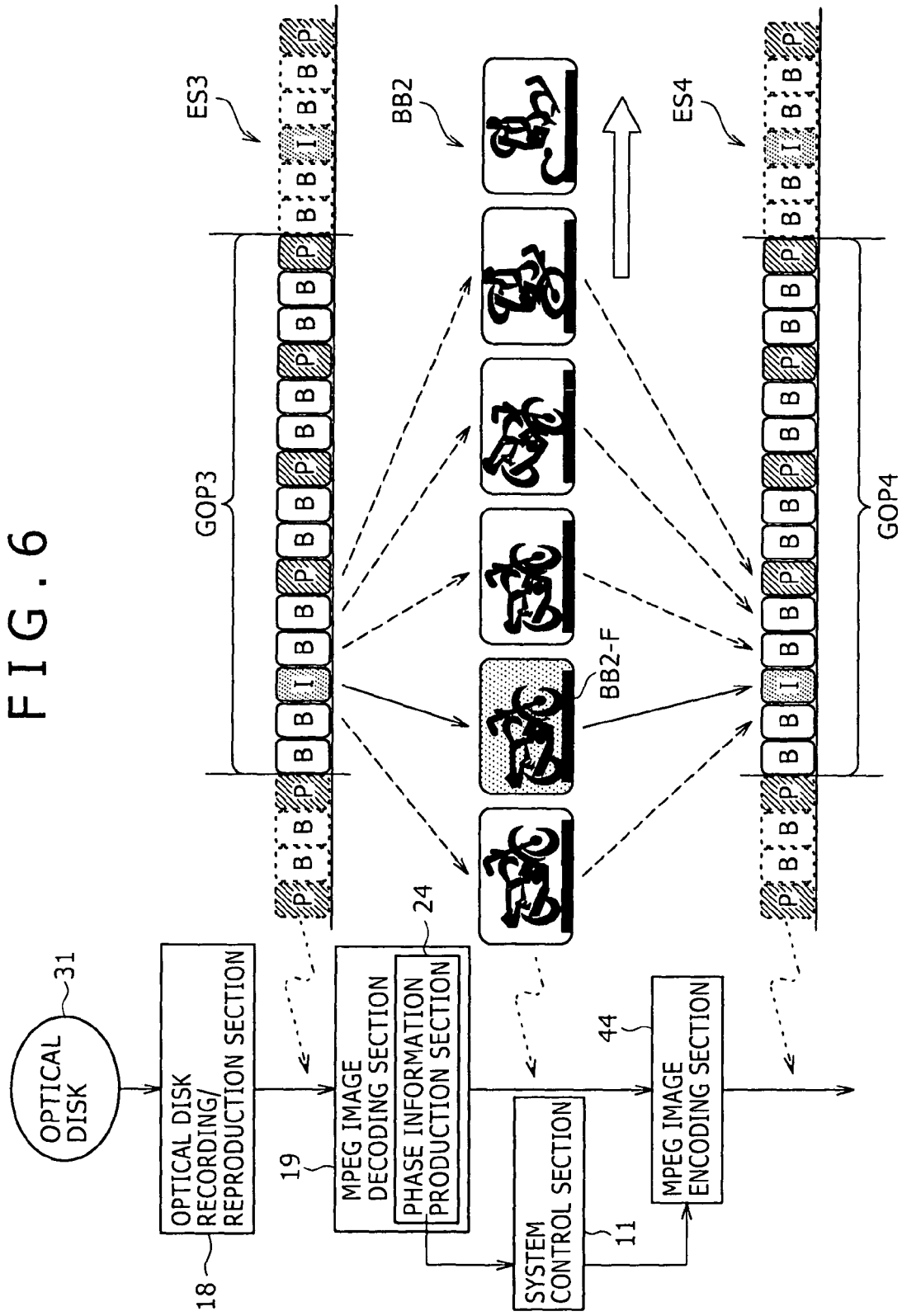
FIG. 6 is a schematic diagrammatic view illustrating an example of a reproduction process of the optical disk recording and reproduction apparatus of FIG. 1.

FIG. 5 is a flow chart illustrating an example of the reproduction process, and FIG. 6 is a diagrammatic view illustrating the example of the reproduction process.

Referring to FIG. 5, first at step S21, the optical disk recording/reproduction section 18 of FIG. 1 or FIG. 6 reproduces or reads out the first ES signal from the optical disk 31.

It is to be noted that, where the reproduction process is executed after the recording process of FIGS. 3 and 4 described hereinabove, the "second ES signal" described hereinabove in connection with the recording process is recorded on the optical disk 31. Accordingly, the "second ES signal" in the recording process is read out as the "first ES signal" in the preproduction process by the process at step S21. The first ES signal "first ES signal" and the "second ES signal" in the recording process and the "first ES signal" and the "second ES signal" in the reproduction process are different from each other in this manner, respectively, and attention should be paid to this fact.

After the first ES signal is provided from the optical disk recording/reproduction section 18 to the MPEG image decoding section 19, the processing advances to step S22. At step S22, the MPEG image decoding section 19 decodes the first ES signal and outputs an HD signal obtained as a result of the decoding to the MPEG image encoding section 44 shown in FIGS. 2 and 6 of the TS inputting/outputting section 13 through the changeover section 20.

At step S23, the phase information production section 24 shown in FIGS. 1 and 6 of the MPEG image decoding section 19 produces GOP phase information of the first ES signal in a unit of a GOP and outputs the produced GOP phase information to the system control section 11.

It is to be noted that, while it is illustrated in the example of FIG. 5 that the process at step S23 is executed after the decoding process at step S22 for the convenience of illustration and description, the process at step S23 may otherwise be executed independently during the decoding process at step S22. In other words, the process of producing GOP phase information regarding a predetermined GOP may be executed during, before or after the decoding process regarding the predetermined GOP.

The processes at steps S21 to S23 are further described with reference to FIG. 6.

In the example of FIG. 6, a signal ES3 is obtained as a result of the process at step S21, that is, as a reproduced first ES signal, and the signal ES3 obtained in this manner is provided to the MPEG image decoding section 19. It is to be noted that each of GOPs which form the signal ES3 has a GOP structure same as the GOP structure of the signal ES1 as described hereinabove.

If such a signal ES3 as described above is decoded by the process at step S22 by the MPEG image decoding section 19, then in the example of FIG. 6, a signal BB2 is obtained as the HD signal. It is to be noted that, in order to facilitate understanding, in FIG. 6, the signal BB2 is schematically shown as a set of images of frames of a motorcycle similarly as in the example of FIG. 4.

In the example of FIG. 6, the signal BB2 is used as an object of a re-encoding process by the MPEG image encoding section 44. In particular, the MPEG image encoding section 44 performs, for the signal BB2, a re-encoding process similar to that executed by the MPEG image encoding section 17 described hereinabove with reference to FIGS. 1 and 4. In particular, the MPEG image encoding section 44 performs such a re-encoding process that a frame which was an I picture in the signal ES3 is selected as it is as an I picture. Or in other words, the MPEG image encoding section 44 performs such a re-encoding process that the phase of the second ES signal is made coincide with the phase of the GOPs of the signal ES3. More particularly, for example, in the example of FIG. 6, the MPEG image encoding section 44 selects a frame BB2-F, which was an I picture in the signal ES3 from within the signal BB2, as it is as an I picture and performs a re-encoding process for the 15 frames corresponding to the GOP GOP3 of the signal ES3. As a result of such a re-encoding process as just described, such a signal ES4 as shown in FIG. 6, that is, a signal ES4 which includes a GOP GOP4 having a phase which coincides with the phase of the GOP GOP3 of the signal ES3, is obtained as the second ES signal.

In order to implement such a re-encoding process of the MPEG image encoding section 44 as described above, information is demanded with which it can be specified which one of frames or data which form an HD signal, which is, in the example of FIG. 6, the signal BB2, was an I picture in the ES signal before decoding such as the signal ES3 in the example of FIG. 4 similarly as in the re-encoding process of the MPEG image encoding section 17. Therefore, in the present embodiment, such information is produced as GOP phase information by the phase information production section 24 of the MPEG image decoding section 19 and provided to the system control section 11.

Then, in the example of FIG. 6, the system control section 11 decides based on the GOP phase information whether or not each of the frames which form the signal BB2, that is, each of the frames including the images of the motorcycle in FIG. 6, was an I picture in the signal ES3. If it is decided that any of the frames was an I picture, then the system control section 11 notifies the MPEG image encoding section 44 of this fact. In particular, in FIG. 6, the system control section 11 notifies the MPEG image encoding section 44 that the frame BB2-F was an I picture in the signal ES3. Thus, the MPEG image encoding section 44 performs, for the signal BB2, a re-encoding process of selecting, from among the frames or data which form the signal BB2, the frame such as the frame BB2-F in the example of FIG. 6 which is designated as an I picture in the notification received from the system control section 11 as an I picture. Then, the MPEG image encoding section 44 provides a signal ES4 obtained as a result of the re-encoding process to the TS stream multiplexing section 45 shown in FIG. 2.

Such a re-encoding process of the MPEG image encoding section 44 under the control of the system control section 11 as described above is executed as a process at step S24 of FIG. 5. In particular, at step S24, the MPEG image encoding section 44 refers to the GOP phase information to re-encode the HD signal so that the phase of the HD signal may coincide with that of the first ES signal. More accurately, the system control section 11 actually refers to the GOP phase information as described hereinabove, and the MPEG image encoding section 44 performs such re-encoding of the HD signal under the control of the system control section 11. Then, the MPEG image encoding section 44 outputs a second ES signal obtained as a result of the re-encoding to the TS stream multiplexing section 45.

Consequently, at step S25, the TS stream multiplexing section 45 converts the second ES signal, which is, in the example of FIG. 6, the signal ES4, into a TS signal and outputs the TS signal to the outside through the IEEE 1394 inputting/outputting section 41 and the terminal 12. In the example of FIG. 1, the TS signal is transmitted to the different apparatus 2.

The reproduction process of the optical disk recording and reproduction apparatus 1 of the example of FIG. 1 is completed therewith.

As can be recognized readily from the comparison of the description given hereinabove with reference to FIGS. 4 and 6, the optical disk recording and reproduction apparatus 1 of the example of FIG. 1 can execute the following series of processes irrespective of the recording process and the reproduction process.

In particular, a decoding process is performed for a first ES signal, which is, in the example of FIG. 4, the signal ES1, and in the example of FIG. 6, the signal ES3 obtained as a result of a first time encoding process. As a result of the decoding process, a baseband signal is obtained which is, in the present embodiment, an HD signal, and particularly in the example of FIG. 4, the signal BB1, and in the example of FIG. 6, the signal BB2. Then, a re-encoding process is performed for the baseband signal, and as a result, a second ES signal is obtained which is, in the example of FIG. 4, the signal ES2, and in the example of FIG. 6, the signal ES4. Such a sequence of processes as just described can be executed by the optical disk recording and reproduction apparatus 1 of the example of FIG. 1 and is hereinafter referred to as decoding/re-encoding process.

Application of such a decoding/re-encoding process as just described makes it possible to satisfy such a demand as, for example, to make the first ES signal and the second ES signal have different bit rates from each other.

For example, the transmission form of a content is sometimes set to a TS signal as in the example described hereinabove. In particular, a TS signal is used as the transmission form of a content, for example, when the content is transmitted as microwaves between a broadcasting station and an automobile such as a van owned by the broadcasting station or when the content is transmitted using a portable telephone set or the like. In such an instance, it is sometimes demanded to transmit the TS signal at a bit rate suitable for a transmission band, that is, at a bit rate different from the recording bit rate.

In such an instance, if such a decoding/re-encoding process as described above is applied, then it is possible to produce a second ES signal after the re-encoding process at a bit rate different from the recording bit rate used to record a first ES signal on a recording medium, that is, at a bit rate suitable for a transmission band and further convert the second ES signal into a TS signal. Thus, the demand described above can be satisfied readily.

Further, if the decoding/re-encoding process is applied, then since a TS signal can be outputted at a bit rate lower than the recording bit rate, also outputting to an HDV I/F in an archive application for a long period of time can be implemented readily.

However, as described hereinabove, if the re-encoding process is executed in the decoding/re-encoding process without the phase of GOPs of the first ES signal taken into consideration, then this gives rise to the problem that the second ES signal obtained as a result of the re-encoding process is degraded significantly. In other words, this gives rise to deterioration of an image upon reproduction of the second ES signal.

Therefore, in order to solve this problem, that is, in order to optimize the reproduction picture quality of the second ES signal to be obtained as a result of the re-encoding process, the re-encoding process is executed so that the phase of GOPs of the second ES signal may coincide with that of GOPs of the first ES signal as described above. The technique just described is applied to the optical disk recording and reproduction apparatus 1 of the example of FIG. 1. The technique described is hereinafter referred to as GOP phase coincidence re-encoding method.

More particularly, the following technique is an example of the GOP phase coincidence re-encoding method. In particular, for example, if the first ES signal does not include a GOP disorder portion, or in other words if all of the GOP structures of GOPs which form the first ES signal coincide with each other, then the decoding process is performed for the first ES signal. Then, when an HD signal obtained as a result of the decoding process is to be re-encoded, a frame which was an I picture in the first ES signal is selected as an I picture to be used as a basis for the re-encoding process from among frames which form the HD signal.

It is to be noted that an example of the GOP phase coincidence re-encoding method where the first ES signal includes a GOP disorder portion is described separately after a GOP disorder portion is hereinafter described with reference to FIGS. 8 to 11.

The GOP phase coincidence re-encoding method is one of the techniques invented by the inventor of the present invention. The GOP phase coincidence re-encoding method can be applied to the optical disk recording and reproduction apparatus 1 of the example of FIG. 1 described hereinabove as well as to any apparatus or system which can execute a decoding/re-encoding process. It is to be noted that the definition of the term system is hereinafter described.

Figure 7:
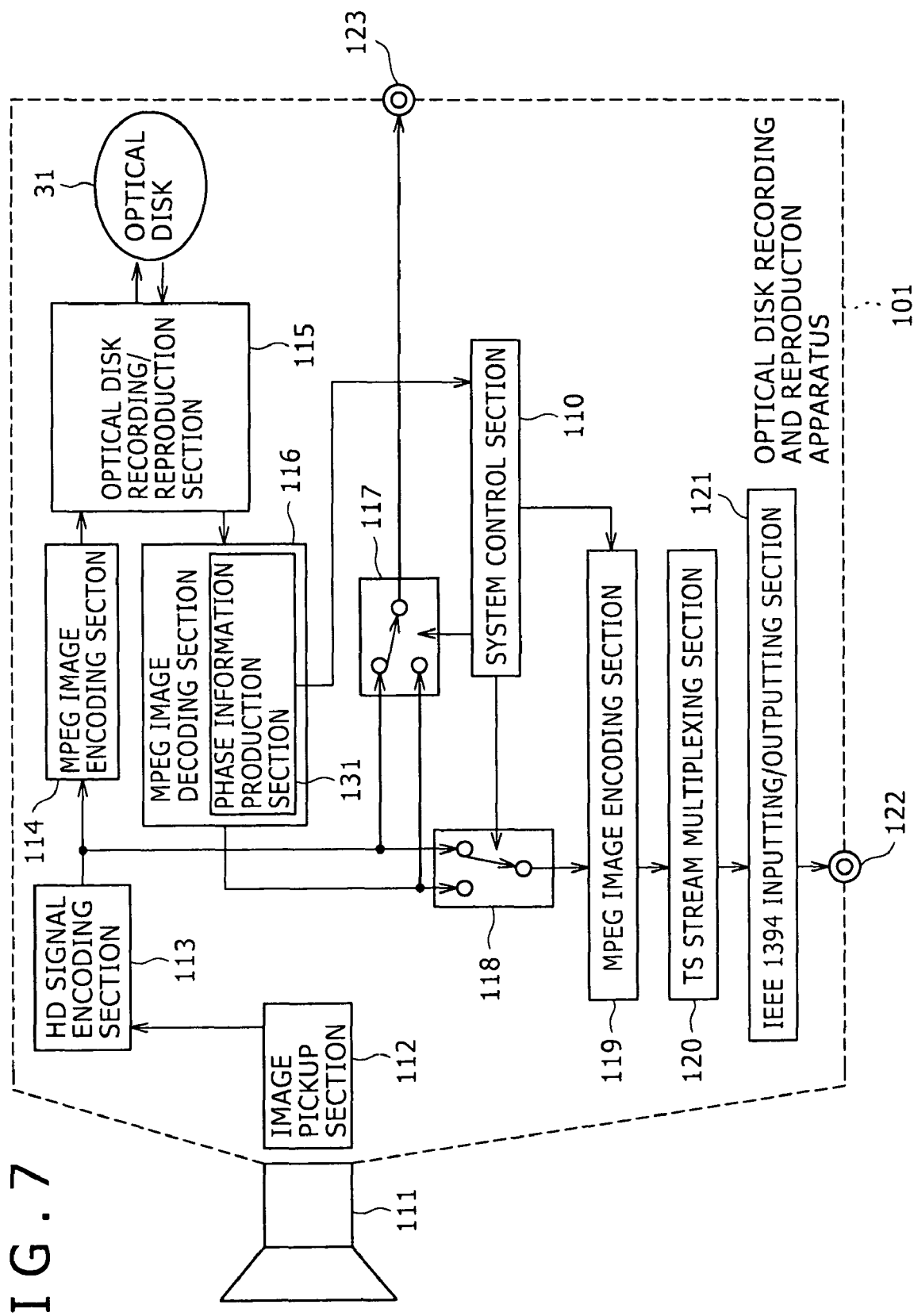
FIG. 7 is a block diagram showing another example of the configuration of the optical disk recording and reproduction apparatus to which the present invention is applied.

In particular, for example, FIG. 7 shows another example of the configuration of the optical disk recording and reproduction apparatus to which the GOP phase coincidence re-encoding method described above is applied. While the optical disk recording and reproduction apparatus of the example of FIG. 1 is the optical disk recording and reproduction apparatus 1 of the deck type, that of FIG. 7 is an optical disk recording and reproduction apparatus 101 of the camcorder type.

Referring to FIG. 7, in the example shown, the optical disk recording and reproduction apparatus 101 includes a system control section 110, a lens 111, an image pickup section 112, an HD signal encoding section 113, an MPEG image encoding section 114, an optical disk recording/reproduction section 115, and an MPEG image decoding section 116. The optical disk recording and reproduction apparatus 101 further includes a changeover section 117, another changeover section 118, an MPEG image encoding section 119, a TS stream multiplexing section 120, and an IEEE 1394 inputting/outputting section 121.

The system control section 110 controls entire action of the optical disk recording and reproduction apparatus 101. However, a particular example of the substance of the control is hereinafter described.

The image pickup section 112 is formed typically from a CCD (Charge-Coupled Device) unit and picks up an image of an image pickup subject not shown, through the lens 111. The image pickup section 112 provides the thus picked up image as an analog image signal to the HD signal encoding section 113.

The HD signal encoding section 113 converts the image signal provided from the image pickup section 112 into an HD signal and provides the HD signal to the MPEG image encoding section 114 and changeover sections 117 and 118.

The MPEG image encoding section 114 compression encodes the HD signal from the HD signal encoding section 113 in accordance with the MPEG system and provides an ES signal obtained as a result of the compression encoding to the optical disk recording/reproduction section 115.

The optical disk recording/reproduction section 115 records or writes the ES signal supplied thereto from the MPEG image encoding section 114 on the optical disk 31.

Further, the optical disk recording/reproduction section 115 reproduces or reads out an ES signal recorded on the optical disk 31 and provides the ES signal to the MPEG image decoding section 116.

The MPEG image decoding section 116 decompression decodes the ES signal read out from the optical disk 31 by the optical disk recording/reproduction section 115 in accordance with the MPEG system. Then, the MPEG image decoding section 116 provides an HD signal obtained as a result of the decompression decoding to the changeover sections 117 and 118.

As hereinafter described, the ES signal inputted to the MPEG image decoding section 116 is the first ES signal obtained as a result of encoding once of the HD signal in the decoding/re-encoding process described hereinabove. In other words, the MPEG image decoding section 116 is a block which corresponds to the MPEG image decoding section 19 of FIG. 1. Accordingly, in order to apply the GOP phase coincidence re-encoding method, the MPEG image decoding section 116 includes a phase information production section 131 having a function and a configuration similar to those of the phase information production section 24 of FIG. 1. In other words, the phase information production section 131 produces GOP phase information regarding an ES signal of a decoding object of the MPEG image decoding section 116, that is, the first ES signal in the decoding/re-encoding process. The phase information production section 131 provides the produced GOP phase information to the system control section 110.

The changeover section 117 changes over an input thereto to one of the HD signal encoding section 113 side and the MPEG image decoding section 116 side under the control of the system control section 110.

In particular, if the input to the changeover section 117 is changed over to the HD signal encoding section 113 side, then the HD signal outputted from the HD signal encoding section 113, that is, an HD signal obtained as a result of image pickup by the image pickup section 112, is inputted on the real time basis to the changeover section 117. Consequently, the HD signal is outputted to the outside through a terminal 123.

On the other hand, if the input to the changeover section 117 is changed over to the MPEG image decoding section 116 side, then the HD signal outputted from the MPEG image decoding section 116, that is, an HD signal recorded once in the form of an ES signal on the optical disk 31 and then reproduced from the optical disk 31, is inputted to the changeover section 117. Consequently, the HD signal is outputted to the outside through the terminal 123.

The changeover section 118 changes over an input thereto to one of the HD signal encoding section 113 side and the MPEG image decoding section 116 side under the control of the system control section 110.

In particular, if the input to the changeover section 118 is changed over to the HD signal encoding section 113 side, then the HD signal outputted from the HD signal encoding section 113, that is, an HD signal obtained as a result of image pickup by the image pickup section 112, is inputted on the real time basis to the changeover section 118. Consequently, the HD signal is inputted to the MPEG image encoding section 119.

On the other hand, if the input to the changeover section 118 is changed over to the MPEG image decoding section 116 side, then the HD signal outputted from the MPEG image decoding section 116, that is, an HD signal recorded once in the form of an ES signal on the optical disk 31 and then reproduced from the optical disk 31, is inputted to the changeover section 118. Consequently, the HD signal is inputted to the MPEG image encoding section 119.

The MPEG image encoding section 119 compression encodes the HD signal from the changeover section 118 in accordance with the MPEG system. Then, the MPEG image encoding section 119 provides an ES signal obtained as a result of the compression encoding to the TS stream multiplexing section 120 under the control of the system control section 110.

Here, FIGS. 6 and 7 are compared with each other. Where the input to the changeover section 118 of FIG. 7 is changed over to the MPEG image decoding section 116 side, it can be recognized that the optical disk recording/reproduction section 115 of FIG. 7 corresponds to the optical disk recording/reproduction section 18 of FIG. 6 or FIG. 1; and the MPEG image decoding section 116 of FIG. 7 corresponds to the MPEG image decoding section 19 of FIG. 6 or FIG. 1 as described hereinabove. It can be further recognized that the system control section 110 of FIG. 7 corresponds to the system control section 11 of FIG. 6 or FIG. 1; and the MPEG image encoding section 119 of FIG. 7 corresponds to the MPEG image encoding section 44 of FIG. 6 or FIG. 2. Further, where FIGS. 2 and 7 are compared with each other, it can be recognized that the TS stream multiplexing section 120 of FIG. 7 corresponds to the TS stream multiplexing section 45 of FIG. 2; the IEEE 1394 inputting/outputting section 121 of FIG. 7 corresponds to the IEEE 1394 inputting/outputting section 41 of FIG. 2; and a terminal 122 of FIG. 7 corresponds to the terminal 12 of FIG. 2 or FIG. 1.

Accordingly, where the input to the changeover section 118 of FIG. 7 is changed over to the MPEG image decoding section 116 side, the optical disk recording and reproduction apparatus 101 can execute the reproduction process described hereinabove with reference to FIGS. 5 and 6 quite similarly as in the optical disk recording and reproduction apparatus 1 of the example of FIG. 1. In particular, the system control section 110, MPEG image decoding section 116 and MPEG image encoding section 119 of the optical disk recording and reproduction apparatus 101 of the example of FIG. 7 can execute the decoding/re-encoding process to which the GOP phase coincidence re-encoding method is applied. As a result, a second ES signal having a phase coincident with the phase of the first ES signal reproduced from the optical disk 31, that is, a second ES signal having optimized reproduction picture quality, is outputted.

Further, since the optical disk recording and reproduction apparatus 101 of the example of FIG. 7 can execute the decoding/re-encoding process itself, it can easily satisfy the following demand. For example, while it is desired to record a content, that is, moving pictures and so forth of an image pickup subject, picked up by the image pickup section 112 as an ES signal of a high bit rate on the optical disk 31, when the content is to be outputted as a TS signal from the terminal 122, it is desired to transmit the content at a low bit rate. In other words, it is desired to implement outputting for an archive application for a long period of time described hereinabove.

Incidentally, it is also supposed that the ES signal of a recording/reproduction object of the optical disk 31 in the optical disk recording and reproduction apparatus 1 of the example of FIG. 1 or the optical disk recording and reproduction apparatus 101 of the example of FIG. 7 may be an ES signal including a GOP disorder portion, that is, a GOP having a different GOP structure from that of the other GOPs, as described hereinabove.

In the following, two examples of an ES signal which includes a GOP disorder portion are described with reference to FIGS. 8 to 11.

Figure 8:
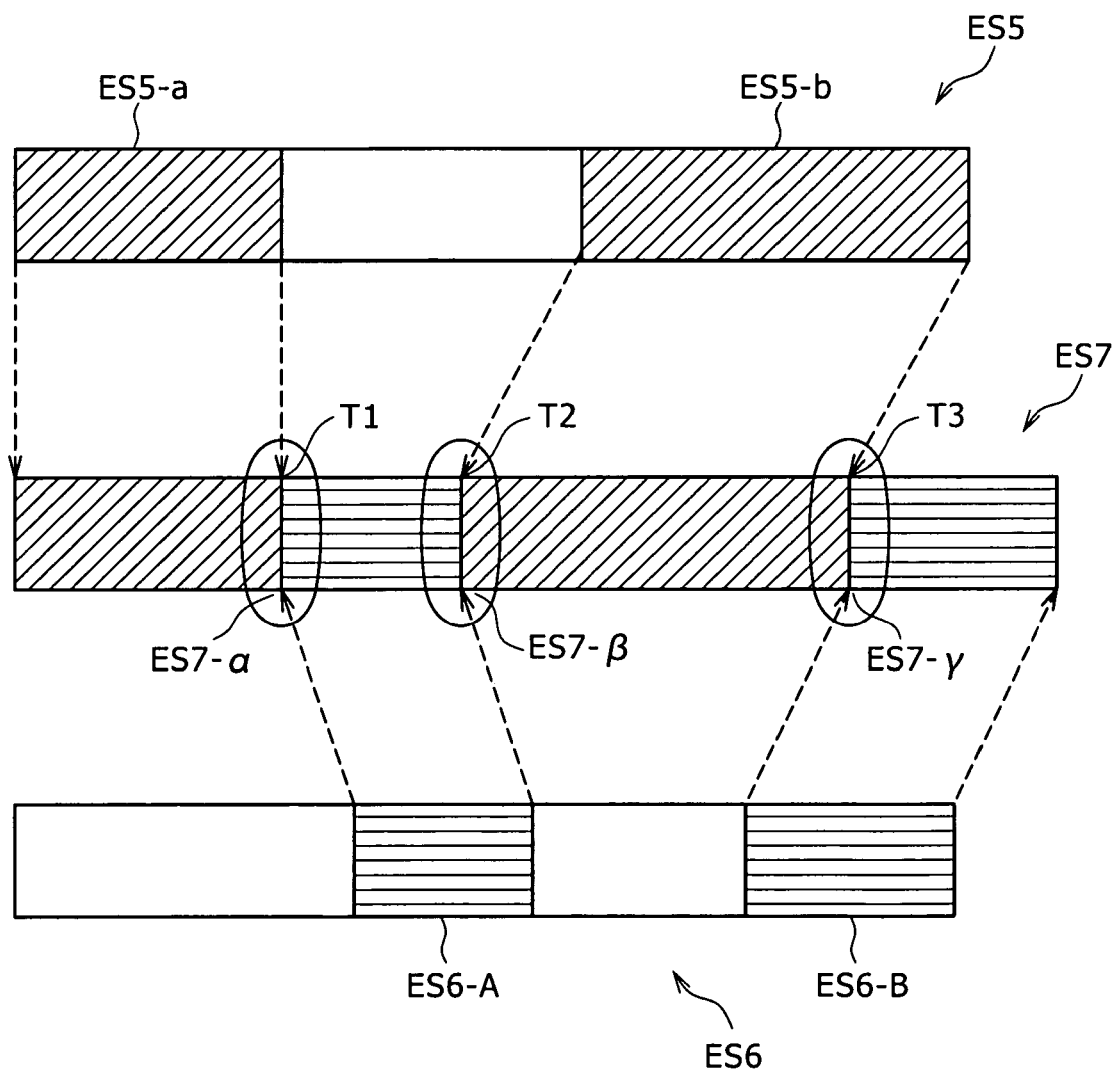
FIG. 8 is a diagrammatic view illustrating an example of an ES signal which includes a GOP disorder portion.

FIG. 8 illustrates a first one of the two examples of an ES signal which includes a GOP disorder portion.

For example, it is assumed that the ES signal recorded on the optical disk 31 includes a signal ES5 shown at the highest position in FIG. 8 and another signal ES6 shown at the lowest position in FIG. 8. Further, it is assumed that the signal ES5 is included in and recorded together with a first file while the signal ES6 is included in and recorded together with a second file.

It is further assumed that the optical disk recording and reproduction apparatus 1 of the example of FIG. 1 and the optical disk recording and reproduction apparatus 101 of the example of FIG. 7 have a function of reading out the signal ES5 in a unit of a frame from the first file and reading out the signal ES6 in a unit of a frame from the second file. It is to be noted that, in the following description given with reference to FIGS. 8 to 11, unless otherwise specified, description is given only of the optical disk recording and reproduction apparatus 1.

In this instance, the optical disk recording and reproduction apparatus 1 can produce, for example, a signal ES7 shown at the central position in FIG. 8.

In particular, the optical disk recording and reproduction apparatus 1 reads out a portion ES5-a of the signal ES5 from the first frame to the second frame and a portion ES6-A of the signal ES6 from the third frame to the fourth frame from the optical disk 31. The optical disk recording and reproduction apparatus 1 further reads out a portion ES5-b of the signal ES5 from the fifth frame to the sixth frame and a portion ES6-B of the signal ES6 from the seventh frame to the eighth frame individually from the optical disk 31. Then, the optical disk recording and reproduction apparatus 1 arranges the frames read in this manner in this order to produce a signal ES7.

It is to be noted that the technique of producing an ES signal like the signal ES7 of FIG. 8 in this manner is hereinafter referred to as disk clip list method.

A portion (GOP) ES7-α appearing around a boundary point T1 between the portion ES5-a and the portion ES6-A of the signal ES7 produced by the disk clip list method sometimes makes a GOP disorder portion, that is, a GOP having a GOP structure different from that of the other GOPs. This is because, since each of the portion ES5-A and the portion ES6-A is formed by extraction in a unit of a frame, the second frame immediately preceding to the boundary point T1 may be an intermediate frame of predetermined GOPs of the signal ES5, or the third frame immediately succeeding the boundary point T1 may be an intermediate frame of GOPs of the signal ES6. From a similar reason, also a portion (GOP) ES7-β appearing around a boundary point T2 between the portion ES6-A and the portion ES5-b or a portion (GOP) ES7-γ appearing around a boundary point T3 between the portion ES5-b and the portion ES6-B may make a GOP disorder portion.

Figure 9:
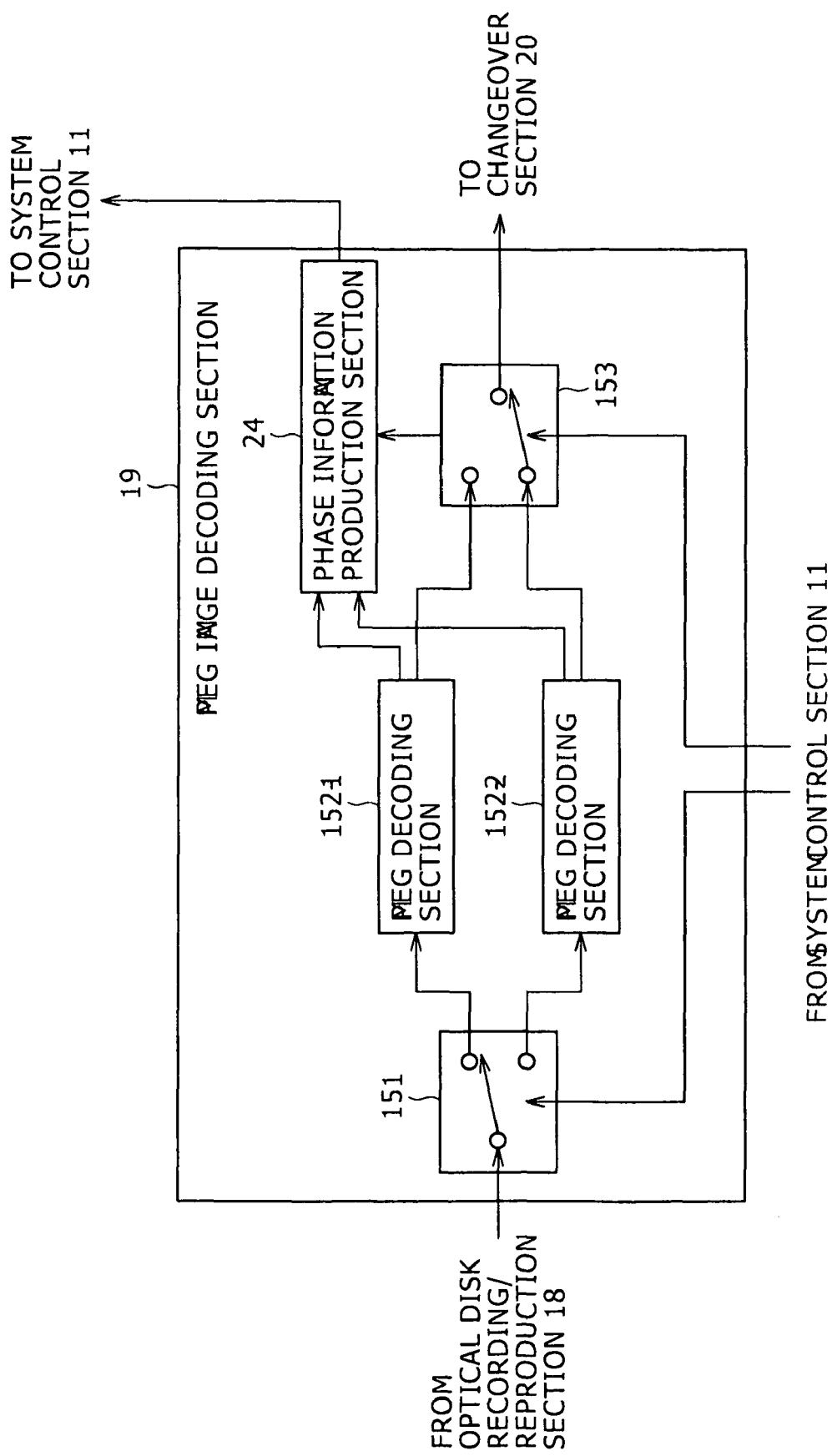
FIG. 9 is a block diagram showing an example of a detailed configuration of an MPEG image decoding section of the optical disk recording and reproduction apparatus of FIG. 1 where an HD signal corresponding to the ES signal including a GOP disorder portion which is illustrated in FIG. 8 can be produced.

In this manner, the signal ES7 is an example of an ES signal produced by the disk clip list method and is an example of an ES signal which includes a GOP disorder portion. In other words, an ES signal produced by the disk clip list method may possibly include a GOP disorder portion.

Where the disk clip list method is applied to the optical disk recording and reproduction apparatus 1 of FIG. 1, the MPEG image decoding section 19 may be configured, for example, in such a manner as seen in FIG. 9. FIG. 9 shows an example of a configuration of the MPEG image decoding section 19 to which the disk clip list method is applied.

In the example of FIG. 9, the MPEG image decoding section 19 includes a changeover section 151, a pair of MPEG decoding sections 152-1 and 152-2 and a changeover section 153 in addition to the phase information production section 24 described hereinabove.

The changeover section 151 changes over an output thereof to the MPEG decoding section 152-1 side or the MPEG decoding section 152-2 side under the control of the system control section 11.

In particular, if the output of the changeover section 151 is changed over to the MPEG decoding section 152-1 side, then an ES signal reproduced from the optical disk 31 shown in FIG. 1 by the optical disk recording/reproduction section 18 is inputted to the changeover section 151 and provided to the MPEG decoding section 152-1.

On the other hand, if the output of the changeover section 151 is changed over to the MPEG decoding section 152-2 side, then an ES signal reproduced from the optical disk 31 shown in FIG. 1 by the optical disk recording/reproduction section 18 is inputted to the changeover section 151 and provided to the MPEG decoding section 152-2.

Each of the MPEG decoding sections 152-1 and 152-2 decompression decodes an ES signal provided thereto from the changeover section 151 in accordance with the MPEG system and provides an HD signal obtained as a result of the decompression decoding to the changeover section 153.

The changeover section 153 changes over an input thereto to the MPEG decoding section 152-1 side or the MPEG decoding section 152-2 side under the control of the system control section 11.

Thus, if the input to the changeover section 151 is changed over to the MPEG decoding section 152-1 side, then the HD signal outputted from the MPEG decoding section 152-1 is inputted to the changeover section 153 and provided to the changeover section 20 shown in FIG. 1.

On the other hand, if the input to the changeover section 151 is changed over to the MPEG decoding section 152-2 side, then the HD signal outputted from the MPEG decoding section 152-2 is inputted to the changeover section 153 and provided to the changeover section 20 shown in FIG. 1.

In the following, an example of action of the MPEG image decoding section 19 of the example of FIG. 9 having the configuration described above is described.

Also here, it is assumed that the signal ES5 of FIG. 8 is included in and recorded together with a first file and the signal ES6 of FIG. 8 is included in and recorded together with a second file on the optical disk 31.

Further, it is assumed that the MPEG decoding section 152-1 is utilized for a decoding process of the first file, and the MPEG decoding section 152-2 is utilized for a decoding process of the second file. This fact is recognized in advance by the system control section 11.

In this instance, when the optical disk recording/reproduction section 18 reads out the substance of the first file, or more accurately when the optical disk recording/reproduction section 18 is controlled so as to read out the substance of the first file, the system control section 11 changes over the output of the changeover section 151 to the MPEG decoding section 152-1 side. Consequently, the substance of the first file, that is, at least part of the signal ES5, is provided to and decoded by the MPEG decoding section 152-1. Then, an HD signal obtained as a result of the decoding process, that is, an HD signal of at least part of the signal ES5, is provided to the changeover section 153.

On the other hand, when the optical disk recording/reproduction section 18 reads out the substance of the second file, or more accurately when the optical disk recording/reproduction section 18 is controlled so as to read out the substance of the second file, the system control section 11 changes over the output of the changeover section 151 to the MPEG decoding section 152-2 side. Consequently, the substance of the second file, that is, at least part of the signal ES6, is provided to and decoded by the MPEG decoding section 152-2. Then, an HD signal obtained as a result of the decoding process, that is, an HD signal of at least part of the signal ES6, is provided to the changeover section 153.

In this manner, an HD signal corresponding to the substance of the first file, that is, an HD signal corresponding to at least part of the signal ES5, or an HD signal corresponding to the substance of the second file, that is, an HD signal corresponding to at least part of the signal ES6, is inputted to the changeover section 153. Consequently, the system control section 11 changes over the input to the changeover section 153 at an appropriate timing. As a result, an HD signal which includes the HD signal corresponding to the substance of the first file and the HD signal corresponding to the substance of the second file in a mixed manner is outputted from the changeover section 153.

More particularly, the portion ES5-$a$ of the signal ES5 from the first frame to the second frame, the portion ES6-A of the signal ES6 from the third frame to the fourth frame, the portion ES5-$b$ of the signal ES5 from the fifth frame to the sixth frame and the portion ES6-B of the signal ES6 from the seventh frame to the eighth frame are read out in this order from the optical disk 31 by the optical disk recording/reproduction section 18. More accurately, the optical disk recording/reproduction section 18 is controlled by the system control section 11 so as to read out the portions of the signal ES5 and the signal ES6 in the order described.

In this instance, before the portion ES5-$a$ is provided, the output of the changeover section 151 remains changed over to the MPEG decoding section 152-1 side. As a result, the portion ES5-$a$ is decoded by the MPEG decoding section 152-1, and an HD signal obtained as a result of the decoding process, that is, an HD signal corresponding to the portion ES5-$a$, is provided to the changeover section 153. At this time, the input of the changeover section 153 remains changed over to the MPEG decoding section 152-1 side, and consequently, the HD signal corresponding to the portion ES5-$a$ is outputted from the MPEG image decoding section 19 and provided to the changeover section 20 shown in FIG. 1.

Then, when the provision of the portion ES5-$a$ to the changeover section 151 comes to an end and provision of the portion ES6-A is started, that is, when the provision of the second frame comes to an end and provision of the third frame is started, the output of the changeover section 151 is changed over to the MPEG decoding section 152-2 side. As a result, now the portion ES6-A is decoded by the MPEG decoding section 152-2, and an HD signal obtained as a result of the decoding process, that is, the HD signal corresponding to the portion ES6-A, is provided to the changeover section 153. At this time, the input to the changeover section 153 is in a state changed over to the MPEG decoding section 152-2 side, and consequently, the HD signal corresponding to the portion ES6-A is outputted from the MPEG image decoding section 19 and provided to the changeover section 20 shown in FIG. 1.

Thereafter, when the provision of the portion ES6-A to the changeover section 151 comes to an end provision of the portion ES5-$b$ is started, that is, when the provision of the fourth frame comes to an end and provision of the fifth frame is started, the output of the changeover section 151 is changed over to the MPEG decoding section 152-1 side. As a result, now the portion ES5-$b$ is decoded by the MPEG decoding section 152-1, and an HD signal obtained as a result of the decoding, that is, the HD signal corresponding to the portion ES5-$b$, is provided to the changeover section 153. At this time, the input to the changeover section 153 is in a state changed over to the MPEG decoding section 152-1, and consequently, the HD signal corresponding to the portion ES5-$b$ is outputted from the MPEG image decoding section 19 and provided to the changeover section 20 shown in FIG. 1.

Then, when the provision of the portion ES5-$b$ to the changeover section 151 comes to an end and provision of the portion ES6-B is started, that is, when the provision of the sixth frame comes to an end and provision of the seventh frame is started, the output of the changeover section 151 is changed over to the MPEG decoding section 152-2 side. As a result, now the portion ES6-B is decoded by the MPEG decoding section 152-2, and the HD signal obtained as a result of the decoding process, that is, the HD signal corresponding to the portion ES6-B, is provided to the changeover section 153. At this time, the input of the changeover section 153 is in a state changed over to the MPEG decoding section 152-2 side, and consequently, the HD signal corresponding to the portion ES6-B is outputted from the MPEG image decoding section 19 and provided to the changeover section 20 shown in FIG. 1.

As a result of the series of processes described above, a signal equivalent to the HD signal obtained as a result of the decoding process performed for the signal ES7 of FIG. 8 including a GOP disorder portion is produced by the MPEG image decoding section 19 and provided to the changeover section 20 shown in FIG. 1.

Thereupon, the phase information production section 24 produces GOP phase information regarding the signal ES7 in a unit of a GOP and provides the produced GOP phase information to the system control section 11.

It is to be noted that, even if information with which that one of frames forming the HD signal outputted from the MPEG image decoding section 19 which has an I picture in the first ES signal before decoding, which is the signal ES7 in the example of FIG. 8, is merely adopted as GOP phase information, it is difficult for the MPEG image encoding section 44 side of FIG. 6 or FIG. 2 to execute a re-encoding process so that the phase of the signal ES7 may be synchronized with the phase of GOPs of the first ES signal.

This is because, while, in the present case, the signal ES7 which is the first ES signal before decoding includes a GOP disorder portion, that is, a GOP having a GOP structure different from that of the other GOPs, this may not be recognized by the MPEG image encoding section 44 side. As a result, the MPEG image encoding section 44 performs a re-encoding process for the GOP disorder portion so that the GOP disorder portion may have a GOP structure same as that of the other GOPs, that is, a prescribed GOP structure. Therefore, that portion of the second ES signal obtained as a result of a re-encoding process which succeeds the GOP disorder portion comes to have a phase which is not synchronized with the phase of GOPs of the signal ES7.

Therefore, the phase information production section 24 of the example of FIG. 9 decides, based on the substance of the decoding process of the MPEG decoding sections 152-1 and 152-2, the changeover situation of the changeover section 153 and so forth, whether or not a GOP of the decoding object is a GOP disorder portion, that is, whether or not the GOP structure of the GOP of the decoding object is the prescribed structure. In other words, the phase information production section 24 of the example of FIG. 9 continues to monitor the phase of each of the GOPs which form the ES signal of the decoding object, that is, the first ES signal in the decoding/re-encoding process.

It is to be noted that, in the present embodiment, the prescribed structure is a GOP structure which includes 15 frames or data and particularly includes 15 frames of B, B, I, B, B, P, B, B, P, B, B, P, B, B, P pictures in the order of reproduction.

Then, if it is decided that the GOP of the decoding object is not a GOP disorder portion, that is, if the GOP of the decoding object has the prescribed structure, then the phase information production section 24 produces GOP phase information. The GOP phase information is information with which an I picture in the GOP of the decoding object can be specified later, that is, information with which it can be specified which one of the frames forming the HD signal corresponds to an I picture. Then, the phase information production section 24 provides the produced GOP phase information to the system control section 11.

On the other hand, if it is decided that the GOP of the decoding object is a GOP disorder portion, that is, if the GOP of the decoding object has a GOP structure other than the prescribed structure, then the phase information production section 24 produces GOP phase information similarly. However, the GOP phase information in this instance is information with which it can be specified which portion of the HD signal corresponds to the GOP disorder portion and with which the GOP structure of the GOP disorder portion can be specified. Then, the phase information production section 24 provides the produced GOP phase information to the system control section 11.

In this instance, even if the first ES signal in the decoding/re-encoding process includes a GOP disorder portion, by utilizing the GOP phase information to control the MPEG image encoding section 44 by the system control section 11 side, it is possible for the MPEG image encoding section 44 of FIG. 6 or FIG. 2 to easily execute such a re-encoding process that the phase of the signal ES7 is synchronized with the phase of GOPs of the first ES signal.

An ES signal produced by the disk clip list method as an example of a first one of the two examples of an ES signal which includes a GOP disorder portion is such as described above with reference to FIGS. 8 and 9.

It is to be noted that, where the disk clip list method is applied to the optical disk recording and reproduction apparatus 101, the MPEG image decoding section 116 may be configured, for example, in such a manner as seen in FIG. 9.

Now, a second one of the two examples of an ES signal which includes a GOP disorder portion is described with reference to FIGS. 10 and 11.

Figure 10:
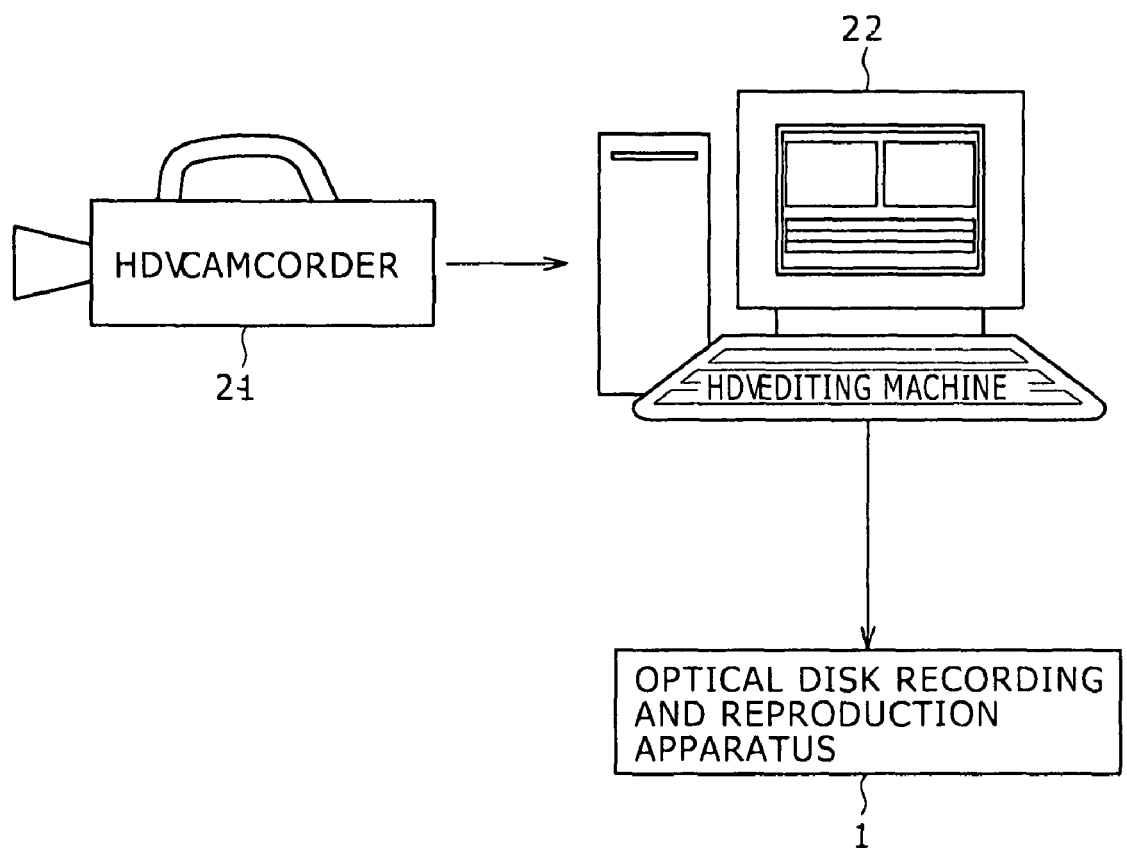
FIG. 10 is a schematic view showing an example of a configuration of a system which includes the optical disk recording and reproduction apparatus of FIG. 1, an HDV editing machine which produces an ES signal including a GOP disorder portion, and an HDV camcorder.

The second example of an ES signal which includes a GOP disorder portion is an ES signal which is produced by an HDV editing machine 2-2 included in such a system as shown in FIG. 10. Referring to FIG. 10, the system includes, in addition to the HDV editing machine 2-2, an HDV camcorder 2-1, and the optical disk recording and reproduction apparatus 1 of the example of FIG. 1. Thus, the different apparatus 2 which is connected to the optical disk recording and reproduction apparatus 1 of the example of FIG. 1 and transmits and receives a content in the form of a TS signal includes the HDV camcorder 2-1 and the HDV editing machine 2-2. Thus, in the system of FIG. 10, an ES signal including a GOP disorder portion may possibly be produced by the HDV editing machine 2-2 and converted into and transferred as a TS signal to the optical disk recording and reproduction apparatus 1.

The HDV camcorder 2-1 picks up an image of an image pickup object such as moving pictures or the like and provides the moving pictures or the like as a content in a predetermined form such as an HD signal or an ES signal obtained by encoding the HD signal in accordance with the MPEG system to the HDV editing machine 2-2.

The HDV editing machine 2-2 can record two or more contents such as moving pictures or the like provided thereto in the form of an ES signal from the HDV camcorder 2-1 and edit the contents.

Figure 11:
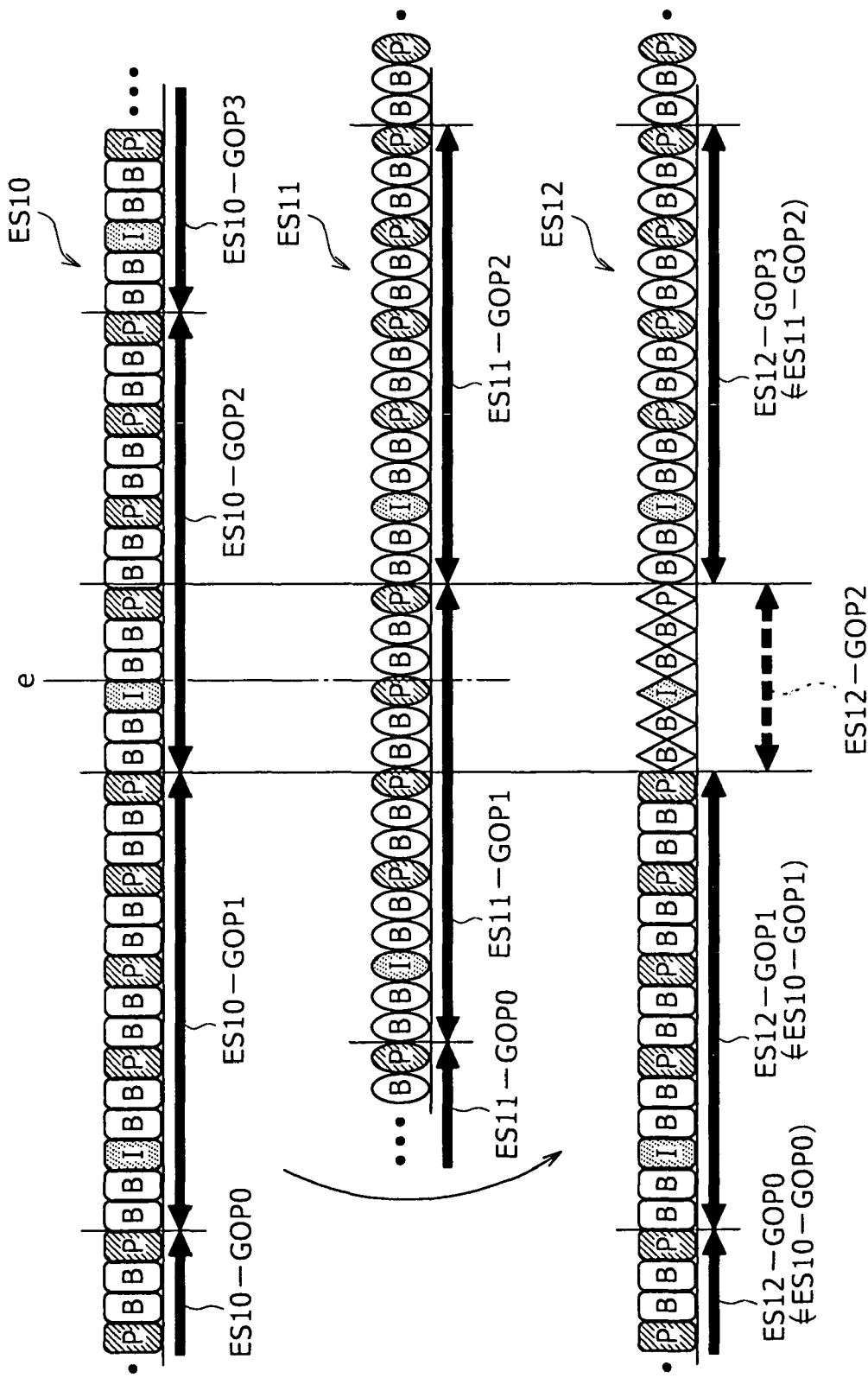
FIG. 11 is a diagrammatic view illustrating another example of the ES signal including a GOP disorder portion which is produced by the HDV editing machine of FIG. 10.

In particular, for example, it is assumed that, as an ES signal of contents, a signal ES10 of a first content and a signal ES11 of a second content illustrated in FIG. 11 are recorded in the HDV editing machine 2-2.

In this instance, the HDV editing machine 2-2 can join part of the signal ES10 and part of the signal ES11 in a unit of a frame together to perform editing of joining part of the first content and part of the second content together.

More particularly, the HDV editing machine 2-2 can perform editing of joining part of the first content and part of the second content together in the following manner. In particular, GOPs ES10-GOP0 and ES10-GOP1 and a portion of 3 frames (B, B, I) of the front half of a GOP ES10-GOP2 from within the signal ES10 are disposed forwardly of an editing point e. Further, 3 frames (B, B, P) of the rear half of a GOP ES11-GOP1, another GOP ES11-GOP2 and succeeding GOPs from within a signal ES11 are disposed rearwardly of the editing point e. The editing point e is a point at which the part of the first content and the part of the second content are joined together.

In this instance, the HDV editing machine 2-2 decodes only those GOPs of the signal ES10 and the signal ES11 which include the editing point e, that is, the GOP ES10-GOP2 of the signal ES10 and the GOP ES11-GOP1 of the signal ES11. As a result, a first HD signal corresponding to the GOP ES10-GOP2 and a second HD signal corresponding to the GOP ES11-GOP1 are obtained. Therefore, the HDV editing machine 2-2 produces a third HD signal wherein the portion corresponding to the 3 frames (B, B, I) of the front half of the GOP ES10-GOP2 and the portion corresponding to the 3 frames (B, B, P) of the rear half of the GOP ES11-GOP1 from within the HD signals are disposed in this order. Then, the HDV editing machine 2-2 re-encodes the third HD signal. As a result, a GOP ES12-GOP2 illustrated in FIG. 11 is obtained. This GOP ES12-GOP2 has a GOP structure of B, B, I, B, B, P which is different from that of the other GOPs and hence makes a GOP disorder portion. Thereafter, the HDV editing machine 2-2 disposes the GOPs ES10-GOP0 and ES10-GOP1 from within the signal ES10 as GOPs ES12-GOP0 and ES12-GOP1, respectively, and then disposes the GOP ES12-GOP2. Further, the HDV editing machine 2-2 disposes the GOP ES11-GOP2 from within the signal ES11 as a GOP ES12-GOP3 and further disposes succeeding GOPs of the signal ES11 in the same order successively next to the GOP ES12-GOP3. Consequently, a signal ES12 equivalent to the ES signal formed by joining the part of the signal ES10 and the part of the signal ES11 together is produced.

It is to be noted that a technique which can implement such a series of processes as described above is hereinafter referred to as smart rendering editing method. In other words, the smart rendering editing method is applied to the HDV editing machine 2-2.

Thereafter, the HDV editing machine 2-2 can convert the signal ES12 produced by the smart rendering editing method into a TS signal and transmit the TS signal to the optical disk recording and reproduction apparatus 1.

In this instance, as apparent from FIG. 11 and as described hereinabove, the GOP ES12-GOP2 of the signal ES12 makes a GOP disorder portion because it has the GOP structure of B, B, I, B, B, P which is different from that of the other GOPs. In other words, the signal ES12 produced by the smart rendering editing method is an example of an ES signal which includes a GOP disorder portion such as the GOP disorder portion ES12-GOP2.

As described hereinabove, an ES signal produced by the smart rendering editing method or the disk clip list method sometimes includes a GOP disorder portion. In other words, if the smart rendering editing method or the disk clip list method is applied to the different apparatus 2 or the like, then an ES signal including a GOP disorder portion may be produced and converted into a TS signal by the different apparatus 2 or the like. The produced and converted ES signal is transmitted to the optical disk recording and reproduction apparatus 1 of the example of FIG. 1.

In such an instance, the phase information production section 51 of the MPEG image decoding section 43 of FIG. 2 or FIG. 4 may perform a process similar to that described above of the phase information production section 24 of the example of FIG. 9, that is, such a process as described below.

In particular, the phase information production section 51 decides whether or not a GOP of a decoding object from within an ES signal of a decoding object from the TS stream decoding section 42, that is, the first ES signal in the decoding/re-encoding process, is a GOP disorder portion. In other words, the phase information production section 51 decides whether or not the GOP of the decoding object has the prescribed structure. Then, the phase information production section 51 continues to monitor the phase of each of GOPs which form the ES signal of the decoding object.

Then, if the phase information production section 51 decides that the GOP of the decoding object is not a GOP disorder portion, that is, if the GOP of the decoding object has the prescribed structure, then the phase information production section 51 produces GOP phase information. The GOP phase information here is information with which an I picture in the GOP of the decoding object can be specified later, that is, information with which it can be specified which one of frames forming the HD signal corresponds to an I picture. Then, the phase information production section 51 provides the produced GOP phase information to the system control section 11.

On the other hand, if it is decided that the GOP of the decoding object is a GOP disorder portion, that is, if the GOP of the decoding object has a GOP structure different from the prescribed structure, then the phase information production section 51 produces GOP phase information. The GOP phase information here is information with which it can be specified which portion of the HD signal corresponds to the GOP disorder portion and with which the GOP structure of the GOP disorder portion can be specified. Then, the phase information production section 51 provides the produced GOP phase information to the system control section 11.

In this instance, if the system control section 11 side controls the MPEG image encoding section 17 shown in FIG. 1 or 4 making use of the GOP phase information, then even when the first ES signal in the decoding/re-encoding process includes a GOP disorder portion, the MPEG image encoding section 17 can readily execute such a re-encoding process that the resulting second ES signal has a phase synchronized with that of GOPs of the first ES signal.

Incidentally, the second ES signal obtained as a result of the re-encoding process of the MPEG image encoding section 17 of FIG. 4 or FIG. 1 is in a state synchronized in phase with GOPs of the first ES signal as described hereinabove. Therefore, if a GOP disorder portion is included in the first ES signal, then a GOP disorder portion is included quite similarly also in the second ES signal. Accordingly, an ES signal including a GOP disorder portion is sometimes recorded on the optical disk 31. This GOP disorder portion may be a GOP which includes an editing point from within an ES signal produced by the smart rendering editing method, which is, in the example of FIG. 11 described hereinabove, the GOP ES12-GOP2 including the editing point e. Or, the GOP disorder portion may be a GOP which includes a boundary point from within an ES signal produced by the disk clip list method. The boundary point may be, in the example of FIG. 8 described hereinabove, the portion ES7-α including the boundary point T1, the portion ES7-β including the boundary point T2 or the portion ES7-γ including the boundary point T3. Accordingly, where a GOP disorder portion is included in an ES signal reproduced from the optical disk 31, if the GOP disorder portion can be detected, then an editing place such as an editing point or a boundary point can be detected efficiently and conveniently.

Thus, when an ES signal including a GOP disorder portion is to be recorded on the optical disk 31, the optical disk recording and reproduction apparatus 1 of the example of FIG. 1 can execute a series of processes after the GOP disorder portion is specified until an essence mark is inserted, that is, until an essence mark is recorded as metadata on the optical disk 31. In the following description, such a series of processes as just described is referred to as metadata production process.

The presence of the essence mark makes it possible to efficiently detect an editing place, that is, an editing point or the like. In particular, such a technique has been utilized heretofore that, in order to detect an editing place, a content recorded on an optical disk or the like is reproduced actually, and a point between two frames between which a change in picture pattern is found is detected as a scene change. In contrast, in the present embodiment, the metadata production process is executed. As a result, it is possible to readily specify a frame to which an essence mark is applied from among frames which form a content recorded on the optical disk 31 or the like and detect the specified frame itself or a place around the specified frame easily as an editing place. Therefore, the detection of an editing place can be performed more efficiently than that according to the common method described above.

Figure 12:
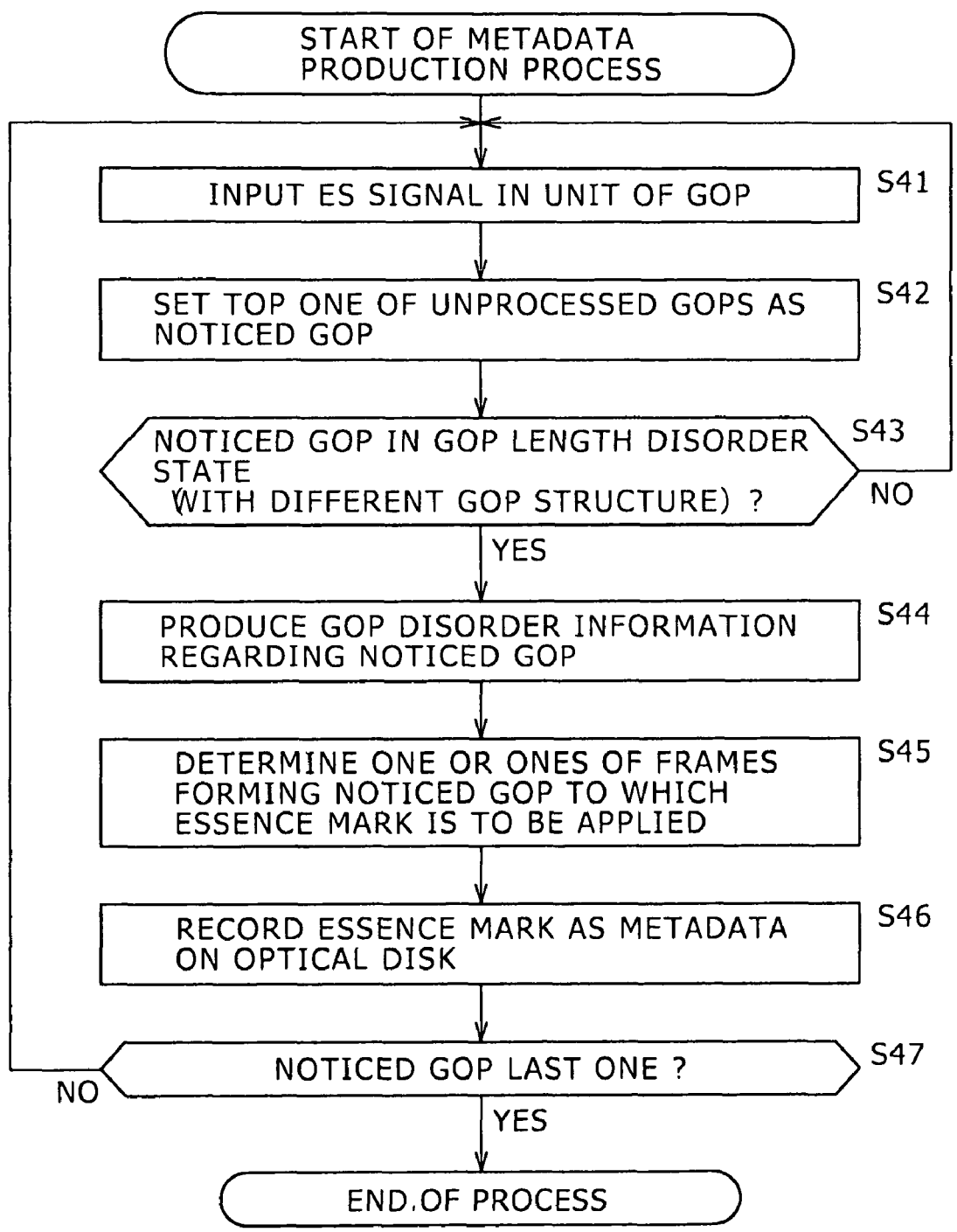
FIG. 12 is a flow chart illustrating an example of a metadata production process of the optical disk recording and reproduction apparatus of FIG. 1.

In the following, an example of the metadata production process is described with reference to FIGS. 12 and 13. FIG. 12 is a flow chart illustrating an example of the metadata production process and FIG. 13 is a schematic diagrammatic view illustrating the example of the metadata production process.

The metadata production process of FIG. 12 is started when an ES signal, that is, the first ES signal in the recording process, is produced by the process at step S1 of the recording process described hereinabove with reference to FIG. 3 by the TS stream decoding section 42 of FIG. 2 and provided to the MPEG image decoding section 43. In other words, the metadata production process of FIG. 12 is executed in parallel to the recording process of FIG. 3.

Figure 13:
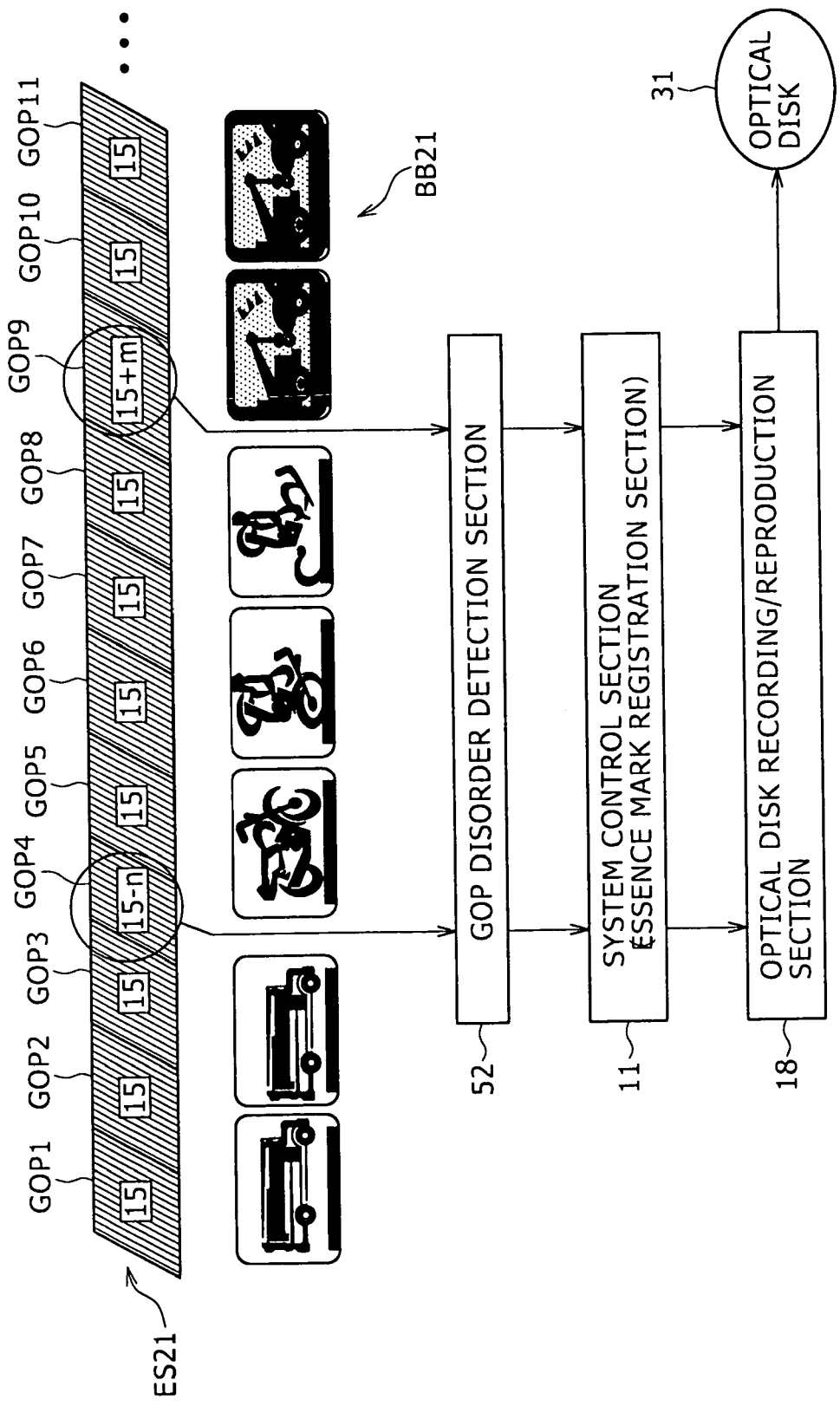
FIG. 13 is a schematic diagrammatic view illustrating an example of the metadata production process of the optical disk recording and reproduction apparatus of FIG. 1.

At step S41, the GOP disorder detection section 52 in FIG. 2 or 13 of the MPEG image decoding section 43 receives an ES signal from the TS stream decoding section 42 in a unit of a GOP as an input thereto.

At step S42, the GOP disorder detection section 52 sets the top one of those GOPs of the ES signal which have not been processed as yet as a noticed GOP.

At step S43, the GOP disorder detection section 52 decides whether or not the noticed GOP exhibits a GOP length disorder, that is, whether or not the noticed GOP has a GOP structure different from that of the other GOPs. In other words, at step S43, the GOP disorder detection section 52 decides whether or not the noticed GOP is a GOP disorder portion described hereinabove.

More particularly, it is assumed that, for example, a signal ES21 illustrated in FIG. 13 is inputted in a unit of a GOP as the ES signal from the TS stream decoding section 42 to the GOP disorder detection section 52. In other words, it is assumed that GOPs GOP1 to GOP11 and so forth which form the signal ES21 are successively inputted to the GOP disorder detection section 52.

It is to be noted that a signal BB21 shown below the signal ES21 in FIG. 13 is an HD signal obtained by decoding the signal ES21 by means of the MPEG image decoding section 43. In order to facilitate understanding, a signal BB21 is schematically shown as a set of images of several representative frames which may be such images of a bus, a motorcycle and so forth as shown in FIG. 13.

If a GOP GOPk (k is an integral value equal to or greater than 1 and is, in the example of FIG. 13, one of 1 to 11) of such a signal ES21 as described above is inputted by the process at step S41, then the GOP disorder detection section 52 sets the GOP GOPk as a noticed GOP at step S42. Then at step S43, the GOP disorder detection section 52 decides whether or not the GOP GOPk has some GOP length disorder, that is, whether or not the GOP GOPk has a GOP structure different from that of the other GOPs.

GOPs in the present embodiment have the prescribed structure which includes 15 frames as described hereinabove, or in other words, the prescribed length of GOPs corresponds to 15 frames. Therefore, the GOP disorder detection section 52 decides at step S43 whether or not the GOP GOPk has a length other than the prescribed length to decide whether or not the GOP GOPk suffers from a GOP length disorder. In other words, the GOP disorder detection section 52 decides whether or not the number of frames included in the GOP GOPk is equal to 15 to decide whether or not the GOP GOPk suffers from a GOP length disorder.

More particularly, the numerical value shown in each of the GOPs in the signal ES21 of FIG. 13 indicates the number of frames included in the GOP. In particular, since "15" is shown in the GOPs GOP1 to GOP3, it can be seen that each of the GOPs GOP1 to GOP3 includes 15 frames, or in other words, the GOPs GOP1 to GOP3 have the prescribed length. Accordingly, if any of the GOPs GOP1 to GOP3 is set as a noticed GOP, then it is decided at step S43 that the GOP GOPk does not suffer from a GOP length disorder. Consequently, the processing returns to step S41 so that the processes at the steps beginning with step S41 are repeated. In particular, a next GOP is set as a new noticed GOP. Thus, if the noticed GOP is the GOP GOP1, GOP2 or GOP3, then the GOP GOP2, GOP3 or GOP4 is set as a new GOP. Then, it is decided whether or not the new noted GOP suffers from a GOP length disorder.

In contrast, 15−n is shown in the GOP GOP4. Here, n is an integral value equal to or higher than 1 but equal to or lower than 14. Therefore, it can be seen that the GOP GOP4 includes 15−n frames, that is, the length of the GOP GOP4 is different from the prescribed length. Accordingly, if the GOP GOP4 is set as a noticed GOP, then it is decided at step S43 that the noticed GOP suffers from a GOP length disorder. Thus, the processing advances to step S44.

At step S44, the GOP disorder detection section 52 produces information with which the noticed GOP, which is, in the present case, the GOP GOP4, can be specified later, information representing that the noticed GOP is a GOP disorder portion, and other necessary information. The information mentioned is hereinafter referred to collectively as GOP disorder information.

The thus produced GOP disorder information is provided from the GOP disorder detection section 52 to the system control section 11 shown in FIG. 1 or 13. Then, the processing advances to step S45.

At step S45, the system control section 11 determines to which one of frames forming the noticed GOP, which is, in the present case, the GOP GOP4, an essence mark should be applied.

It is to be noted that the frame of an object of application of the essence mark is not specifically limited. In other words, any frame which forms the noticed GOP as a GOP disorder portion may make an object of application of the essence mark. Also the number of frames to which the essence mark should be applied may be any number within the range of the total number of frames which form the noticed GOP.

Accordingly, the system control section 11 may determine, for example, all frames, 15 frames in the present embodiment, from among the frames which form the noticed GOP as an object of application of the essence mark. Or, the system control section 11 may determine only predetermined several ones of such frames as an object of application of the essence mark.

Further, in the latter case, that is, in the case wherein only predetermined several ones of the frames are determined as an object of application of the essence mark, the method of application is not specifically limited. For example, such a determination method may be used that the top frame of the noticed GOP is determined as an object of application of an essence mark. Or, for example, such a determination method may be used that a scene change point is detected and frames around the scene change point are determined as an object of application of the essence mark. Also the detection method in this instance is not specifically limited.

At step S46, the system control section 11 controls the optical disk recording/reproduction section 18 to record the essence mark regarding the noticed GOP, which is, in the present case, the GOP GOP4, that is, the essence mark applied to the frame determined by the process at step S45, as metadata on the optical disk 31.

It is to be noted that the processing timing at step S46, that is, the recording timing of the essence mark regarding the noticed GOP on the optical disk 31, may generally be the processing timing at step S5 of the recording process of FIG. 3 or a timing around the processing timing. In other words, the recording timing may be the recording timing of the second ES signal in the recording process or a timing around the recording timing. It is to be noted that the second ES signal is obtained as a result of a decoding process performed for the signal BB21 which is obtained, in the example of FIG. 13, by a decoding process for the signal ES21. However, where the essence mark is not included in the second ES signal but is recorded as separate independent metadata on the optical disk 31, the recording timing of the essence mark is not specifically limited.

At step S47, the system control section 11 decides whether or not the noticed GOP is the last one of the GOPs.

For example, in the present case, the noticed GOP is the GOP GOP4, and therefore, it is decided at step S47 that the noticed GOP is not the last one of the GOPs. Consequently, the processing returns to step S41 so that the processes at the steps beginning with step S41 are repeated.

In particular, the GOPs GOP5 to GOP11 and succeeding GOPs are successively set as a noticed GOP, and the processes at steps S41 to S46 are executed for the noticed GOP.

For example, if one of the GOPs GOP5 to GOP8, GOP10 and GOP11 in the example of FIG. 13 is set as a noticed GOP by the process at step S42, then a decision of NO is made at the next step S43. As a result, the noticed GOP, that is, any of the frames which form the noticed GOP, is not set as an object of application of the essence mark, and the processing advances to step S41. Consequently, at next step S42, a next GOP is newly set as a noticed GOP.

On the other hand, for example, if the GOP GOP9 is set as a noticed GOP by the process at step S42, then since 15+m is shown in the GOP GOP9 in FIG. 13, it can be seen that the GOP GOP9 includes 15+m frames, that is, the GOP GOP9 has a length other than the prescribed length. Here, m of 15+m is an integral value equal to or higher than 1 but equal to or lower than 14. Accordingly, at next step S43, it is decided that the noticed GOP suffers from a GOP length disorder, that is, the length of the noticed GOP is other than the prescribed length. Then at step S45 after the process at step S44, one or more of the frames which form the noticed GOP are determined as an object of application of the essence mark. Then at step S46, the essence mark is recorded as metadata on the optical disk 31. Thereafter, the processing returns again to step S41, and then at step 42 immediately following the step S41, a next GOP is set as a new noticed GOP.

It is to be noted that, while, in the example described above, the essence mark is adopted as metadata, the metadata is not restricted specifically. In particular, any information can be adopted as the metadata if it allows specification of a GOP which suffers from a GOP disorder, that is, a GOP having a length other than the prescribed length, or in other words, a GOP disorder portion.

Incidentally, where an ES signal including a GOP having a length greater than the prescribed length, which is, in the present embodiment, a length corresponding to 15 frames, is recorded on the optical disk 31, the following problem sometimes occurs. It is to be noted that such a GOP having a length greater than the prescribed length as described above is hereinafter referred to as excessive length GOP disorder portion. In particular, when an ES signal is to be reproduced from the optical disk 31, it can be reproduced normally at an ordinary speed. However, if it is tried to perform specific reproduction such as fast feed reproduction, then reproduction of an excessive length GOP disorder portion or a succeeding portion may not be performed normally. The problem described is hereinafter referred to as specific reproduction impossibility problem.

Therefore, in order to solve the specific reproduction impossibility problem, the inventor of the present invention has made an invention of another new technique, which is hereinafter referred to as excessive length GOP disorder portion matching recording method. According to the excessive length GOP disorder portion matching recording method, when an ES signal including an excessive length GOP disorder portion is recorded on a recording medium, which is, in the present embodiment, the optical disk 31, recording of the excessive length GOP disorder portion is inhibited. On the other hand, a portion of the ES signal which precedes to the excessive length GOP disorder portion is recorded in and together with a first file on the recording medium. Further, another portion of the ES signal which succeeds the excessive length GOP disorder portion is recorded in and together with a second file on the recording medium.

Figure 14:
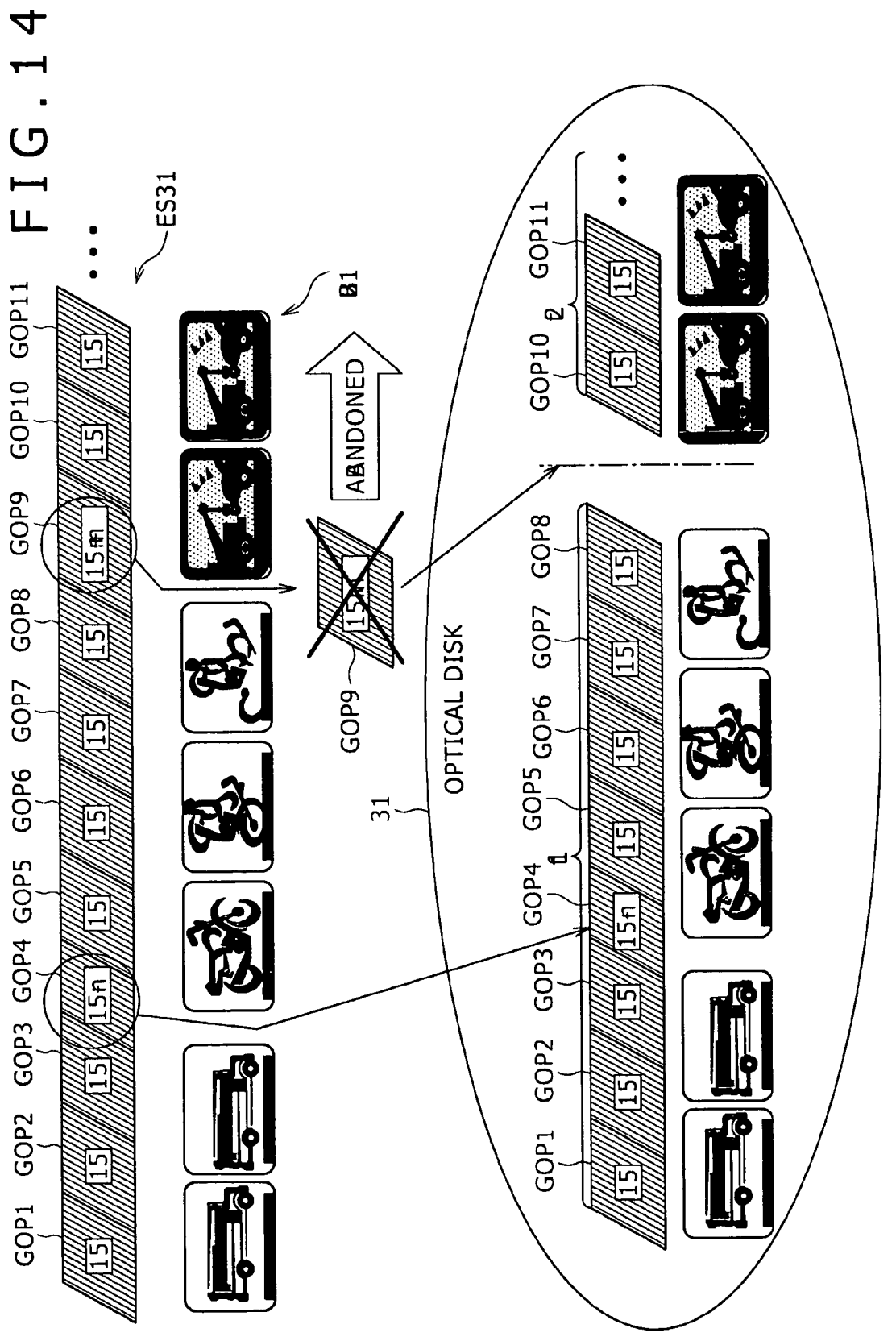

FIG. 14 diagrammatically illustrates the excessive length GOP disorder portion matching recording method.

Referring to FIG. 14, in the example shown, a signal ES31 is prepared as an ES signal of an object of recording on the optical disk 31. The signal ES31 is a second ES signal obtained by decoding the signal ES21 of FIG. 13 which is a first ES signal and then re-encoding an HD signal, that is, the signal BB21, obtained as a result of the decoding.

Accordingly, the signal ES31 includes the GOPs GOP4 and GOP9 as GOP disorder portions similarly as in the signal ES21. However, since the GOP GOP4 has the length of 15−n frames which is smaller than the prescribed length, which in the present case is the length corresponding to 15 frames, it does not make an excessive length GOP disorder portion. On the other hand, the GOP GOP9 has the length of 15+m frames which is greater than the prescribed length, it makes an excessive length GOP disorder portion.

Accordingly, as seen in FIG. 14, from within the signal ES31, only the GOP GOP9 which is an excessive length GOP disorder portion becomes an object of inhibition of recording on the optical disk 31 and is abandoned. Meanwhile, the portion of the signal ES31 which includes the GOPs GOP1 to GOP8 preceding to the GOP GOP9 is recorded as a first file f1 on the optical disk 31, and the portion of the signal ES31 which succeeds the GOP GOP9 and includes the GOPs GOP10, GOP11, . . . is recorded as a second file f2 on the optical disk 31.

As described above, while the GOPs GOP4 and GOP9 of the signal ES31 are GOP disorder portions, only the GOP GOP9 which is an excessive length GOP disorder portion makes an object of inhibition of recording according to the excessive length GOP disorder portion matching recording method. In other words, the GOP GOP4 which is not an excessive length GOP disorder portion becomes an object of recording, and consequently, recording of the GOP GOP4 is permitted. The reason why the GOP GOP4 which is not an excessive length GOP disorder portion becomes an object of recording and recording of it is permitted is such as follows. In particular, where the length of the GOP is smaller than the prescribed length, or in other words, where the GOP is not an excessive length GOP disorder portion, specific reproduction such as fast feeding reproduction can be performed normally.

If such an excessive length GOP disorder portion matching recording method as described above is applied to the optical disk recording and reproduction apparatus 1 of the example of FIG. 1, then the optical disk recording and reproduction apparatus 1 can execute such a series of processes as described below.

In particular, the GOP disorder detection section 52 of FIG. 2 executes processes corresponding to the processes at steps S41 to S44 from within the metadata production process of FIG. 12. However, at the processing timing at step S43, a process of deciding whether or not the noticed GOP is an excessive length GOP disorder portion is executed in place of the process at step S43 described hereinabove.

Then, the system control section 11 of FIG. 1 controls the optical disk recording/reproduction section 18 in the following manner based on the GOP disorder information. In particular, recording of the excessive length GOP disorder portion, which is, in the example of FIG. 14, the GOP GOP9, of the ES signal outputted from the MPEG image encoding section 17, that is, in the example of FIG. 14, of the signal ES31, is inhibited. On the other hand, the portion of the ES signal which precedes to the excessive length GOP disorder portion is recorded as a first file, which is, in the example of FIG. 14, the first file f1, on the optical disk 31. Further, the portion of the ES signal which succeeds the excessive length GOP disorder portion is recorded as a second file, which is, in the example of FIG. 14, the second file f2, on the optical disk 31.

More particularly, it is assumed that the ES signal of an object of recording is successively outputted from the MPEG image encoding section 17 in a unit of a GOP beginning with the top GOP. In this instance, every time a GOP is outputted from the MPEG image encoding section 17, the system control section 11 decides based on the GOP disorder information whether or not, regarding the GOP as a noticed GOP, the noticed GOP is an excessive length GOP disorder portion.

If it is decided that the noticed GOP is not an excessive length GOP disorder portion, then the system control section 11 controls the optical disk recording/reproduction section 18 to record the noticed GOP in an object file on the optical disk 31.

Here, the object file is, where a GOP immediately preceding to the noticed GOP is not an excessive length GOP disorder portion, a file in which the immediately preceding GOP is recorded, but where the immediately preceding GOP is an excessive length GOP disorder portion, a file produced newly. In other words, when the system control section 11 decides that the noticed GOP is not an excessive length GOP disorder portion and besides is a GOP immediately succeeding an excessive length GOP disorder portion, the system control section 11 controls the optical disk recording/reproduction section 18 to produce a new file as an object file on the optical disk 31 and then store the noticed GOP in the new object file.

On the other hand, if it is decided that the noticed GOP is an excessive length GOP disorder portion, then the system control section 11 executes an ending process for the object file till then and controls the optical disk recording/reproduction section 18 to inhibit recording of the noticed GOP on the optical disk 31.

The excessive length GOP disorder portion matching recording method is implemented by execution of such a series of processes as described above.

As described above, where the excessive length GOP disorder portion matching recording method is applied, an excessive length GOP disorder portion such as the GOP GOP9 in the example of FIG. 14 is not recorded on a recording medium such as the optical disk 31 in the embodiment of the present invention described above with reference to FIG. 14 and so forth. Therefore, an effect can be anticipated that the specific reproduction impossibility problem can be solved, that is, a first effect that specific reproduction such as fast feeding reproduction of an ES signal recorded on the recording medium can be performed normally.

Further, where the excessive length GOP disorder portion matching recording method is applied, since portions preceding to and succeeding an excessive length GOP disorder portion of an ES signal of an object of recording are recorded in separate files from each other, the following second and third effects can be anticipated.

In particular, in an ES signal produced by the smart rendering editing method or the like described hereinabove, an editing point is included in an excessive length GOP disorder portion. Accordingly, where the excessive length GOP disorder portion matching recording method is applied, an ES signal produced by the smart rendering editing method or the like is recorded such that separate contents or ES signals before editing are included in separate files from each other. Therefore, the second effect that an editing point can be detected readily can be anticipated.

Further, where the excessive length GOP disorder portion matching recording method is applied together with a function of registering the top frame or data of a file as a thumbnail image or data, the third effect can be anticipated that the top frames of separate contents or ES signals before editing from within an ES signal produced by the smart rendering editing method can be registered individually as thumbnail images.

It is to be noted that, where attention is paid to the second and third effects, a GOP to be selected as an object of inhibition of recording on a recording medium may be an excessive length GOP disorder portion as well as all of GOP disorder portions including a GOP having a length smaller than the prescribed length such as the GOP GOP4 in the example of FIG. 14.

In this instance, the excessive length GOP disorder portion matching recording method is expanded in the following manner. In particular, when an ES signal including a GOP disorder portion is to be recorded on a recording medium such as the optical disk 31 in the present embodiment, recording of the GOP disorder portion of the ES signal is inhibited. Further, a portion of the ES signal preceding to the GOP disorder portion is included in and recorded together with a first file on the recording medium, and another portion of the ES signal succeeding the GOP disorder portion is included in and recorded together with a second file on the recording medium. It is to be noted that such a technique as just described is hereinafter referred to as GOP disorder portion matching recording method. In other words, the excessive length GOP disorder portion matching recording method is a form of the GOP disorder portion matching recording method and can be regarded as a technique wherein a GOP of an object of inhibition of recording is limited to an excessive length GOP disorder portion.

Further, a reproduction machine in related art is available which does not include an MPEG encoder for recording which corresponds to the MPEG image encoding section 17 of FIG. 1. Also such a reproduction machine in related art as just mentioned can acquire an ES signal, that is, an encoded signal, from a TS signal transmitted from the different apparatus 2 of FIG. 1 or the like if it has a TS interface which corresponds to the IEEE 1394 inputting/outputting section 41 and the TS stream decoding section 42 of FIG. 2. Further, the reproduction machine can record the ES signal as it is on an optical disk once. However, where the ES signal corresponding to the inputted TS signal is a product by the smart rendering editing method or the like, it sometimes includes an excessive length GOP disorder portion as described hereinabove. The reproduction machine in related art has a problem that, in such an instance as just described, it may not record the ES signal including the excessive length GOP disorder portion as it is because of the format. The excessive length GOP disorder portion matching recording method provides also a fourth effect that it can solve the problem just described of the reproduction machine in related art.

In particular, if the excessive length GOP disorder portion matching recording method is applied to a reproduction machine which does not include an MPEG encoder for recording, then the fourth effect that, even if a TS signal corresponding to an ES signal including an excessive length GOP disorder portion is inputted, the TS signal can be recorded.

In other words, the fourth effect can be considered as an effect that an ES signal corresponding to a TS signal except an excessive length GOP disorder portion can be recorded by a simple method without such a complicated process or without the necessity for a process that the TS signal is recorded after a decoding/re-encoding process is performed therefor as in the case of the example of FIG. 1.

FIG. 15 shows an example of a configuration of a reproduction machine which can achieve such a fourth effect as described above, that is, a reproduction machine to which the excessive length GOP disorder portion matching recording method is applied and which does not include an MPEG encoder for recording. It is to be noted that, although such a reproduction machine as just described is directed principally to reproduction of a content or an ES signal, it has a function of recording a content or an ES signal on an optical disk once as described hereinabove. Therefore, also a reproduction machine of the type described is hereinafter referred to as optical disk recording and reproduction apparatus.

Referring to FIG. 15, the optical disk recording and reproduction apparatus 201 includes an IEEE 1394 inputting/outputting section 211, a TS decoding section 212, a GOP length monitoring section 213, a system control section 214, an optical disk recording/reproduction section 215, an MPEG image decoding section 216, an HD signal outputting section 217 and a TS multiplexing section 219.

The IEEE 1394 inputting/outputting section 211 receives a TS signal transmitted thereto from a different apparatus 2 not shown in FIG. 15, refers to FIG. 1 or the like and provides the received TS signal to the TS decoding section 212. Further, the IEEE 1394 inputting/outputting section 211 transmits a TS signal provided thereto from the TS multiplexing section 219 to the different apparatus 2 or the like.

The TS decoding section 212 converts the TS signal supplied thereto from the IEEE 1394 inputting/outputting section 211 into an ES signal and provides the ES signal in a unit of a GOP to the GOP length monitoring section 213 and the optical disk recording/reproduction section 215.

The GOP length monitoring section 213 sets, every time a GOP is inputted thereto, the GOP as a noticed GOP and monitors or detects the length of the noticed GOP. Then, the GOP length monitoring section 213 provides a result of the monitoring or detection to the system control section 214.

The system control section 214 controls action of the entire optical disk recording and reproduction apparatus 201.

In particular, for example, the system control section 214 decides, based on a result of monitoring of the GOP length monitoring section 213, whether or not the noticed GOP is an excessive length GOP disorder portion, that is, in the present embodiment, a GOP which includes a number of frames exceeding the prescribed length, which is, in the present embodiment, 15, and hence a number of frames equal to or greater than 16 frames.

If it is decided that the noticed GOP is not an excessive length GOP disorder portion, then the system control section 214 controls the optical disk recording/reproduction section 215 to record the noticed GOP in an object file on the optical disk 31.

However, if the system control section 214 decides that the noticed GOP is not an excessive length GOP disorder portion and besides immediately succeeds an excessive length GOP disorder portion, then it controls the optical disk recording/reproduction section 215 to produce a new file as an object file on the optical disk 31 and store the noticed GOP in the new object file.

On the other hand, if it is decided that the noticed GOP is an excessive length GOP disorder portion, then the system control section 214 executes an ending process for the object file till then and controls the optical disk recording/reproduction section 215 to inhibit recording of the noticed GOP on the optical disk 31.

In this manner, the optical disk recording/reproduction section 215 records or writes the ES signal provided thereto from the TS decoding section 212 on the optical disk 31 under the control of the system control section 214.

Further, the optical disk recording/reproduction section 215 reproduces or reads out an ES signal stored on the optical disk 31 and provides the ES signal to at least one of the MPEG image decoding section 216 and the TS multiplexing section 219 under the control of the system control section 214.

The MPEG image decoding section 216 decompression decodes, if an ES signal read out from the optical disk 31 is provided thereto from the optical disk recording/reproduction section 215, the ES signal in accordance with the MPEG system. Then, the MPEG image decoding section 216 provides an HD signal obtained as a result of the decompression decoding to the HD signal outputting section 217.

The HD signal outputting section 217 provides the HD signal provided thereto from the MPEG image decoding section 216, that is, an HD signal recorded in the form of an ES signal on the optical disk 31, to a different apparatus not shown in FIG. 15 such as, for example, the different apparatus 4 of FIG. 1 through a terminal 218.

The TS multiplexing section 219 converts, when an ES signal read out from the optical disk 31 by the optical disk recording/reproduction section 215 is provided thereto, the ES signal into a TS signal and provides the TS signal to the IEEE 1394 inputting/outputting section 211.

FIG. 16 is a flow chart illustrating an example of a recording process of the optical disk recording and reproduction apparatus 201 of FIG. 15 having the configuration described above.

First, at step S61, the TS decoding section 212 converts a TS signal inputted to the IEEE 1394 inputting/outputting section 211 into an ES signal.

At step S62, the GOP length monitoring section 213 receives the ES signal obtained as a result of the process at step S61 in a unit of a GOP as an input thereto.

At step S63, the GOP length monitoring section 213 sets a top one of those GOPs which are not processed as yet as a noticed GOP and detects the length of the noticed GOP.

If a result of the detection of the GOP length monitoring section 213, that is, the length of the noticed GOP, is provided to the system control section 214, then the processing advances to step S64. At step S64, the GOP length monitoring section 213 decides whether or not the length of the noticed GOP is greater than the prescribed length which corresponds, in the present embodiment, to 15 frames. In other words, the GOP length monitoring section 213 decides whether or not the noticed GOP is an excessive length GOP disorder portion.

If it is decided at step S64 that the length of the noticed GOP is not greater than the prescribed length or is equal to or smaller than the prescribed length, that is, the noticed GOP is not an excessive length GOP disorder portion, then the processing advances to step S65. At step S65, the system control section 214 decides whether or not an object file is produced already.

As described hereinabove, where the noticed GOP is not an excessive length GOP disorder portion and besides immediately succeeds an excessive length GOP disorder portion, since a new object file is not produced as yet, a decision of NO is made by the process at step S65. Consequently, the processing advances to step S66. At step S66, the system control section 214 controls the optical disk recording/reproduction section 215 to produce an object file on the optical disk 31. Thereafter, the processing advances to step S67.

On the other hand, if the noticed GOP is not an excessive length GOP disorder portion and besides does not immediately succeed an excessive length GOP disorder portion, then an object file is produced already, that is, an object file in which the immediately preceding GOP is recorded exists. In such an instance, a decision of YES is made by the process at step S65. Thus, the processing advances to step S67 without executing the process at step S66, that is, without newly producing an object file.

At step S67, the system control section 214 controls the optical disk recording/reproduction section 215 to record the noticed GOP in the object file of the optical disk 31. Thereafter, the processing advances to step S70. It is to be noted that the processes at steps beginning with step S70 are hereinafter described.

As described hereinabove, where the noticed GOP is not an excessive length GOP disorder portion, after a decision of NO is made by the process at step S64, the processes at steps S65 to S67 are executed to record the noticed GOP in the object file.

On the other hand, where the noticed GOP is an excessive length GOP disorder portion, after a decision of YES is made at step S64, the following processes at steps beginning with step S68 are executed.

In particular, at step S68, the system control section 214 controls the optical disk recording/reproduction section 215 to inhibit recording of the noticed GOP on the optical disk 31, that is, abandon the noticed GOP.

Then at step S69, the system control section 214 executes an ending process of the object file. It is to be noted that, in the process at step S65 after the ending process of the object file is executed, it is decided that an object file is not produced. After the process at step S69 comes to an end, that is, after the ending process of the object file comes to an end, the processing advances to step S70.

At step S70, the system control section 214 decides whether or not the noticed GOP is the last GOP.

Where the noticed GOP is not the last one of the GOPs which form the ES signal obtained by the process at step S61, a decision of NO is made at step S70. Thus, the processing is returned to step S62 so that the processes at the steps beginning with step S62 are executed repetitively. In particular, a next GOP is set as a noticed GOP, and the processes at steps S64 to S69 described hereinabove are executed for the new noticed GOP.

On the other hand, where the noticed GOP is the last GOP, a decision of YES is made at step S70, and consequently, the recording process is ended.

While the series of processes described above can be executed by hardware, it may otherwise be executed by software. Where the series of processes is executed by software, a program which constructs the software is installed from a program recording medium into a computer incorporated in hardware for exclusive use or, for example, a personal computer for universal use which can execute various functions by installing various programs.

FIG. 17 is a block diagram showing an example of a configuration of a personal computer which executes the series of processes described hereinabove in accordance with a program. In particular, the entirety or part, for example the system control section and so forth described hereinabove, of the optical disk recording and reproduction apparatus described hereinabove can be configured also as a personal computer of the configuration shown in FIG. 17.

Referring to FIG. 17, a CPU (Central Processing Unit) 301 executes various processes in accordance with a program stored in a ROM (Read Only Memory) 302 or a storage section 380. A program to be executed by the CPU 301, data and so forth are suitably stored into a RAM (Random Access Memory) 303. The CPU 301, ROM 302 and RAM 303 are connected to one another by a bus 304.

Also an input/output interface 305 is connected to the CPU 301 through the bus 304. An inputting section 306 including a keyboard, a mouse, a microphone and so forth and an outputting section 307 including a display unit, a speaker and so forth are connected to the input/output interface 305. The CPU 301 executes various processes in accordance with an instruction inputted from the inputting section 306. Then, the CPU 301 outputs a result of the processes to the outputting section 307.

A storage section 308 formed from a hard disk or the like is connected to the input/output interface 305 and stores a program to be executed by the CPU 301 and various data. A communication section 309 communicates with an external apparatus connected thereto through a network such as the Internet and/or a local area network.

A program may be acquired through the communication section 309 and stored into the storage section 308.

A drive 310 is connected to the input/output interface 305. When a removable medium 311 such as a magnetic disk, an optical disk, a magneto-optical disk, a semiconductor memory or the like is suitably loaded into the drive 310, the drive 310 drives the removable medium 311. Thereupon, the drive 310 acquires a program, data and so forth recorded on the removable medium 311. The acquired program or data are transferred to and stored into the storage section 308 as occasion demands.

Further, when the removable medium 311 is loaded into the drive 310, the drive 310 may drive the removable medium 311 and record data and so forth on the removable medium 311.

The program recording medium on which a program to be installed into a computer and placed into an executable condition by the computer is recorded may be, for example, as shown in FIG. 17, a removable medium 311 in the form of a package medium formed from a magnetic disk including a floppy disk, an optical disk including a CD-ROM (Compact Disk-Read Only Memory) and a DVD (Digital Versatile Disk), a magneto-optical disk, or a semiconductor memory. Else, the program recording medium may be formed as the ROM 302 in which the program is recorded temporarily or permanently or a hard disk included in the storage section 308 or the like. Storage of the program into the program recording medium is performed, as occasion demands, through the communication section 209 which is an interface such as a router and a modem, making use of a wired or wireless communication medium such as a local area network, the Internet or a digital satellite broadcast.

Further, while the recording designation of a content such as an ES signal is, in the example described hereinabove, the optical disk 31, it is not limited specifically. For example, the removable medium 311, the hard disk which forms the storage section 308 or the like may be used as the recording designation.

It is to be noted that, in the present specification, the steps which describe the program recorded in a program recording medium may be but need not necessarily be processed in a time series in the order as described, and include processes which are executed in parallel or individually without being processed in a time series.

Further, in the present specification, the term "system" is used to represent an entire apparatus composed of a plurality of devices or apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. A recording apparatus for recording, when an encoded stream is provided, the encoded stream on a predetermined recording medium, the encoding stream including a plurality of groups each including a plurality of encoded unit data obtained by an encoding process performed for a plurality of unit data which form a stream, said recording apparatus comprising:
   a detection section, incorporated in hardware, configured to detect the structure of each of the groups which form the encoded stream; and
   a recording control section, incorporated in hardware, configured to produce, when a different group having a structure different from a prescribed structure is detected by said detection section, specification information with which the position of the different group in the encoded stream can be specified and record the specification information as metadata of the encoded stream on the predetermined recording medium,
   wherein the stream includes a plurality of frames as the unit data;
   said encoded stream is a stream of GOPs as the groups obtained by an encoding process performed for the stream in accordance with the MPEG system;
   said detection section detects, as the prescribed structure of each of the GOPs, the number of frames as the encoded unit data included in the GOP; and
   said recording control section decides, if a GOP which includes a number of frames other than the prescribed number is detected by said detection section, the GOP as the different group and produces the specification information regarding the different group.

2. The recording apparatus according to claim 1, wherein said recording control section produces, as the specification information, an essence mark to be applied to one or more ones of the frames which form the GOP decided as the different group.

3. The recording apparatus according to claim 2, wherein said recording control section produces, as the specification information, the essence mark to be applied to a top one of the frames which form the GOP decided as the different group.

4. The recording apparatus according to claim 2, wherein said recording control section produces, as the specification information, the essence mark to be applied to frames which precede to and succeed a scene change point from among the frames which form the GOP decided as the different group.

5. The recording apparatus according to claim 2, wherein said recording control section produces, as the specification information, the essence mark to be applied to all of the frames which form the GOP decided as the different group.

6. A recording apparatus for recording, when an encoded stream is provided, the encoded stream on a predetermined recording medium, the encoding stream including a plurality of groups each including a plurality of encoded unit data obtained by an encoding process performed for a plurality of unit data which form a stream, said recording apparatus comprising:
   a detection section, incorporated in hardware, configured to detect the structure of each of the groups which form the encoded stream;
   a recording control section, incorporated in hardware, configured to produce, when a different group having a structure different from a prescribed structure is detected by said detection section, specification information with which the position of the different group in the encoded stream can be specified and record the specification information as metadata of the encoded stream on the predetermined recording medium;
   an acquisition section configured to acquire, when a first encoded stream obtained by performing an encoding process for a first stream which makes an object of recording on the predetermined recording medium is provided to the first encoded stream;
   a decoding section configured to perform a decoding process for the first encoded stream acquired by said acquisition section and output a second stream obtained as a result of the decoding process; and
   an encoding section configured to perform an encoding process for the second stream outputted from said decoding section and output a second encoded stream obtained as a result of the encoding process, wherein
   said detection section detects the structure of each of the groups which form the first encoded stream acquired by said acquisition section, and
   said recording control section produces, when the different group is detected from within the first encoded stream by said detection section, the specification information with which the position of that one of the groups in the second encoded stream outputted from said encoding section which corresponds to the different group and record the specification information as metadata of the second encoded stream on the predetermined recording medium.

7. The recording apparatus according to claim 6, wherein, when the first encoded stream formed from a plurality of first encoded unit data obtained as a result of the encoding stream successively performed for a plurality of first unit data which form the first stream is provided, said acquisition section acquires the first encoded stream, said decoding section successively performs the decoding process for the first encoded unit data which form the first encoded stream acquired by said acquisition section and output the second stream which is formed from a plurality of second unit data obtained as a result of the decoding process, and said encoding section successively performs the encoding process for the second unit data which form the second stream outputted from said decoding section and output the second encoded stream formed from a plurality of second encoded unit data obtained as a result of the encoding process, said recording apparatus further comprising:

a phase information production section configured to monitor the decoding process of said decoding section to produce phase information which includes one or more pieces of specification information with which the disposed position of that one of the first encoded unit data which corresponds to a predetermined one of the second unit data in the first encoded stream signal can be specified; and an encoding control section configured to control, based on the phase information produced by said phase information production section, the encoding process of said encoding section for noticed data, which is that one of the second unit data which makes an object of the encoding process by said encoding section, so that the disposition position of that one of the first encoded unit data which corresponds to the noticed data in the first encoded stream signal and the disposition position of that one of the second encoded unit data which corresponds to the noticed data in the second encoded stream signal may coincide with each other.

* * * * *